United States Patent
Hoshi et al.

(10) Patent No.: US 10,280,849 B2
(45) Date of Patent: May 7, 2019

(54) COMBUSTION SYSTEM CONTROL DEVICE

(71) Applicant: DENSO CORPORATION, Kariya, Aichi-pref. (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/774,404

(22) PCT Filed: Nov. 4, 2016

(86) PCT No.: PCT/JP2016/082746
§ 371 (c)(1),
(2) Date: May 8, 2018

(87) PCT Pub. No.: WO2017/090404
PCT Pub. Date: Jun. 1, 2017

(65) Prior Publication Data
US 2018/0328293 A1    Nov. 15, 2018

(30) Foreign Application Priority Data
Nov. 23, 2015    (JP) .................................. 2015-228271

(51) Int. Cl.
*F02D 19/02* (2006.01)
*B60W 10/06* (2006.01)
(Continued)

(52) U.S. Cl.
CPC ........... *F02D 19/029* (2013.01); *B60W 10/06* (2013.01); *F02D 35/028* (2013.01);
(Continued)

(58) Field of Classification Search
CPC .... F02D 19/029; F02D 19/022; F02D 41/401; F02D 41/3836; F02D 23/02;
(Continued)

(56) References Cited

U.S. PATENT DOCUMENTS

2007/0277591 A1* 12/2007 Hoshi .................. F02D 35/023
73/35.05
2016/0363080 A1* 12/2016 Okabayashi ........ F02D 41/1438
(Continued)

FOREIGN PATENT DOCUMENTS

| JP | 2009-127460 | 6/2009 |
|---|---|---|
| JP | 2009-185654 | 8/2009 |
| JP | 2013-024138 | 2/2013 |

*Primary Examiner* — Sizo B Vilakazi
(74) *Attorney, Agent, or Firm* — Nixon & Vanderhye P.C.

(57) ABSTRACT

An ECU, as a combustion system control device, includes various control units such as a first estimation unit, a second estimation unit, a comparison/selection unit, and an injection control unit. The first estimation unit estimates, as a first estimation value, the mixing ratio of each molecular structure species contained in fuel based on the value detected by an in-cylinder pressure sensor that is a combustion sensor. The second estimation unit estimates, as a second estimation value, the above mixing ratio based on the values detected by a density sensor and a dynamic viscosity sensor that are property sensors. The comparison/selection unit compares the first estimation value with the second estimation value to select an estimation value with higher estimation accuracy, and various control units such as the injection control unit control the operation of a combustion system by using the selected estimation value.

9 Claims, 9 Drawing Sheets

(51) Int. Cl.
  *F02D 41/14* (2006.01)
  *F02D 41/38* (2006.01)
  *F02D 41/40* (2006.01)
  *F02D 35/02* (2006.01)
  *F02D 41/00* (2006.01)
  *F02D 23/02* (2006.01)

(52) U.S. Cl.
  CPC ..... *F02D 41/0025* (2013.01); *F02D 41/1475* (2013.01); *F02D 41/3836* (2013.01); *F02D 41/401* (2013.01); *F02D 19/022* (2013.01); *F02D 23/02* (2013.01); *F02D 2200/0606* (2013.01); *F02D 2200/0611* (2013.01)

(58) Field of Classification Search
  CPC ......... F02D 41/1475; F02D 2200/0606; F02D 2200/0611; B60W 10/06
  See application file for complete search history.

(56) References Cited

U.S. PATENT DOCUMENTS

2016/0363084 A1* 12/2016 Hoshi .................... F02D 41/26
2018/0275016 A1*  9/2018 Okabayashi .......... G01M 15/02
2018/0320602 A1* 11/2018 Okabayashi ............ F02D 45/00
2018/0320624 A1* 11/2018 Okabayashi ............ F02D 45/00

* cited by examiner

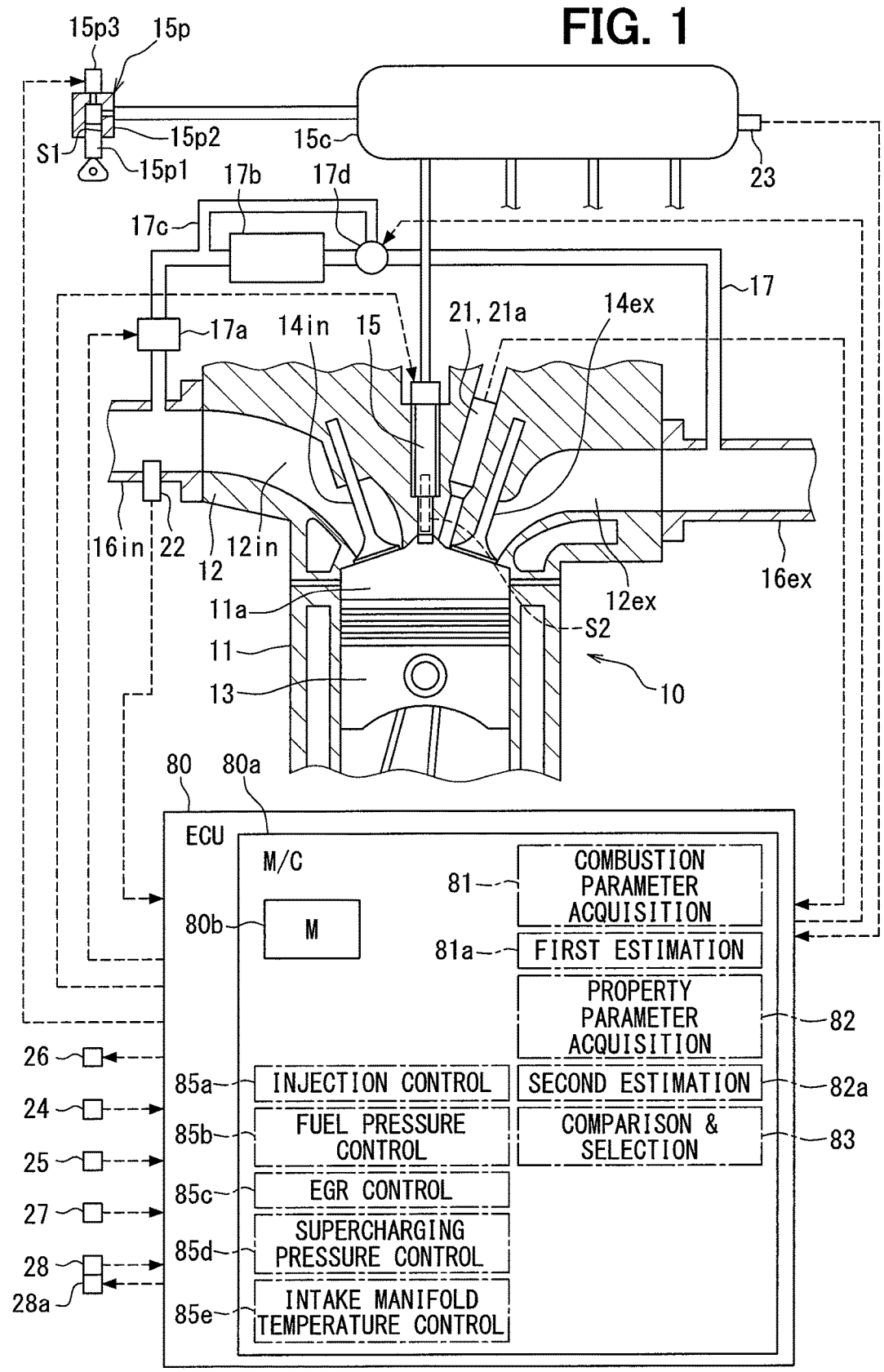

FIG. 2

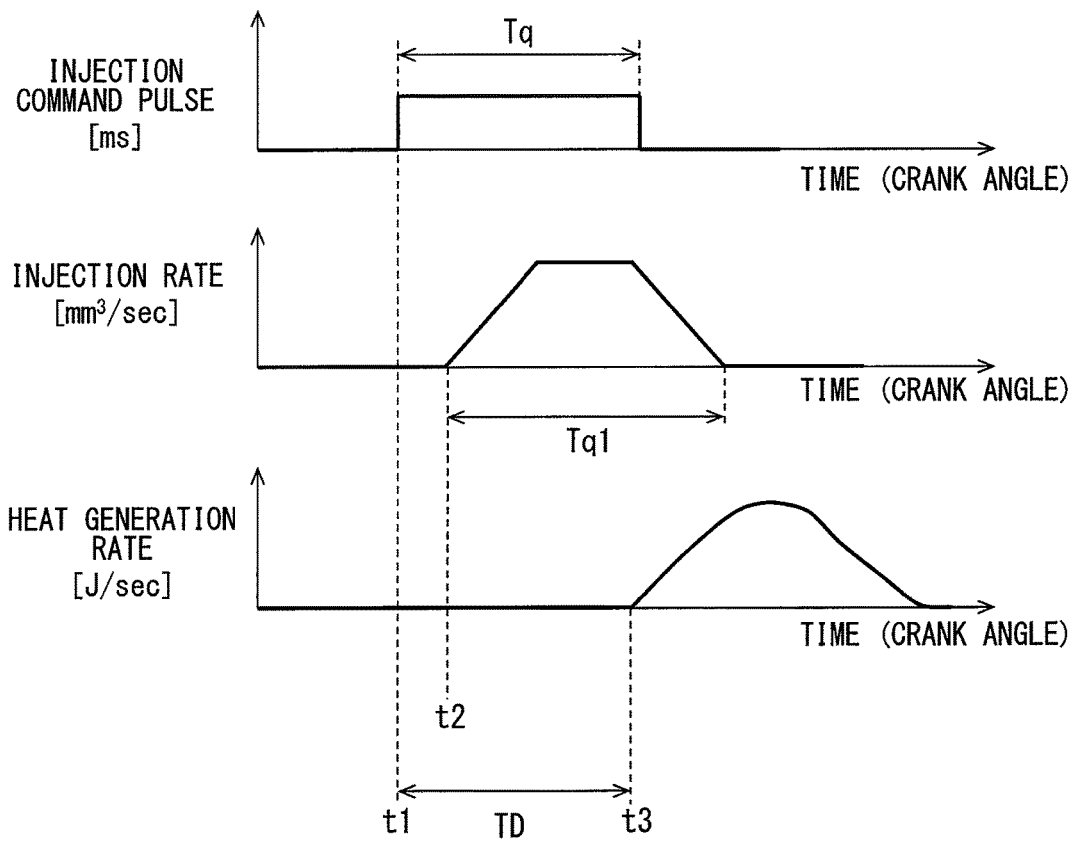

FIG. 3

$$\begin{pmatrix} \text{MIXING AMOUNTS OF} \\ \text{NORMAL PARAFFINS} \\ \text{MIXING AMOUNTS OF} \\ \text{NAPHTHENES} \\ \text{MIXING AMOUNTS OF} \\ \text{ISOPARAFFINS} \\ \text{MIXING AMOUNTS OF AROMAS} \\ \vdots \end{pmatrix} = \begin{pmatrix} a_{00} & \cdots & a_{0Y} \\ \vdots & \ddots & \vdots \\ a_{X0} & \cdots & a_{XY} \end{pmatrix} \cdot \begin{pmatrix} TD(i) \\ TD(j) \\ TD(k) \\ TD(l) \\ \vdots \end{pmatrix}$$

MOLECULAR STRUCTURE SPECIES — CONSTANTS — FUEL PARAMETER

FIG. 4
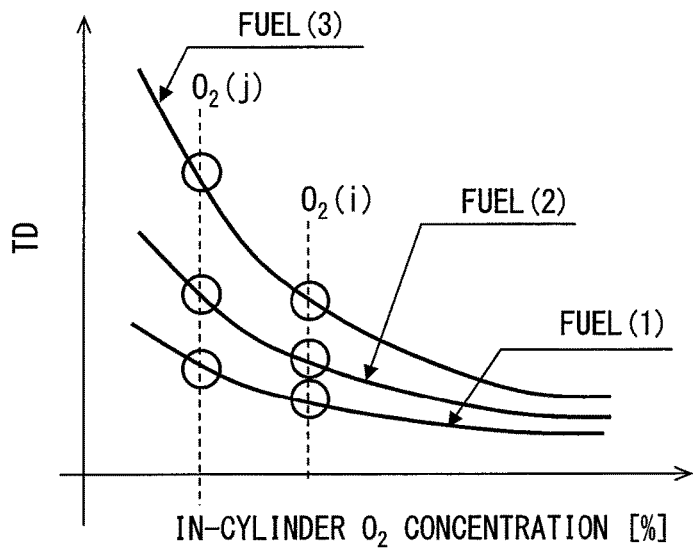
FIG. 5
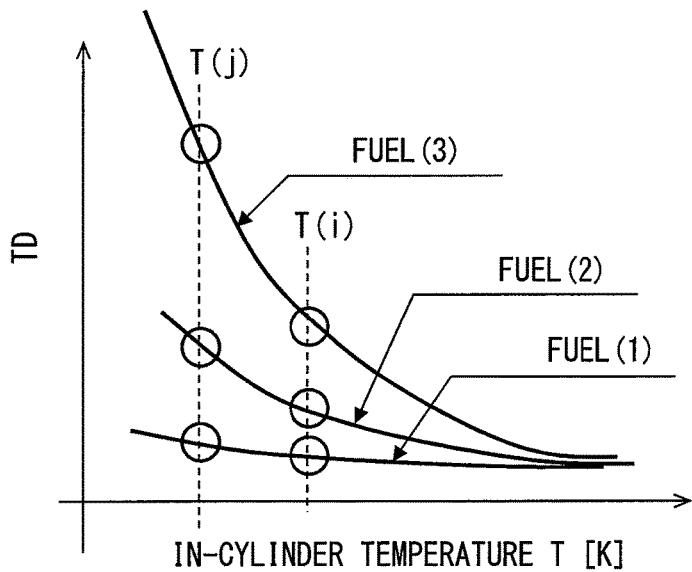
FIG. 6
|  | MOLECULAR STRUCTURE SPECIES A | MOLECULAR STRUCTURE SPECIES B | MOLECULAR STRUCTURE SPECIES C |
|---|---|---|---|
| FUEL (1) | LARGE | LARGE | SMALL |
| FUEL (2) | SMALL | LARGE | SMALL |
| FUEL (3) | LARGE | SMALL | LARGE |

COMBUSTION SYSTEM CONTROL DEVICE

CROSS REFERENCE TO RELATED APPLICATION

This application is the U.S. national phase of International Application No. PCT/JP2016/082746 filed 4 Nov. 2016, which designated the U.S. and claims priority to Japanese Patent Application No. 2015-228271 filed on Nov. 23, 2015, the entire contents of each of which are incorporated herein by reference.

TECHNICAL FIELD

The present disclosure relates to a combustion system control device that controls an operation of a combustion system.

BACKGROUND ART

A conventional control device, which controls the operation of a combustion system including an internal combustion engine, controls the injection amount and injection timing of fuel, an EGR amount, a supercharging pressure, and the like so as to output a desired power while keeping, for example, exhaust emission and a fuel consumption rate within appropriate ranges.

The properties of fuel to be supplied to a combustion system, such as, for example, the dynamic viscosity, density, volatility, ignitability, and the like of the fuel, differ depending on the mining location, refinery location, and the like of the fuel. If the properties of fuel are different, optimal control contents also differ. Therefore, a technique is conventionally known in which the dynamic viscosity of fuel is detected by a dynamic viscosity sensor such that the control contents are corrected in accordance with the detection result.

However, the components contained in fuel differ from fuel to fuel, and the mixing ratios of the various components also differ from fuel to fuel. For example, the components contained in fuel and the mixing ratios of the components differ depending on the mining location, refinery location, and the like of the fuel, such as fuel containing a large amount of aroma components and fuel containing a large amount of paraffin components. Therefore, even if fuel has the same value detected by a dynamic viscosity sensor, the components contained in the fuel may actually differ or the mixing ratios of the components may actually differ. Therefore, in a conventional method of changing a control content in accordance with the results detected by a dynamic viscosity sensor, there is a limit to the implementation of optimal control in accordance with fuel.

RELATED ART DOCUMENT

Patent Document

Patent Document 1: JP 2013-24138 A

SUMMARY OF INVENTION

An object of the present disclosure is to provide a combustion system control device that improves control of the operations of a combustion system with an optimal content in accordance with fuel.

According to one embodiment of the present disclosure, a combustion system control device is applied to a combustion system including an internal combustion engine, a combustion sensor that detects a combustion parameter representing a combustion state of the internal combustion engine, and a property sensor that detects a property parameter representing a property of fuel to be used for the combustion of the internal combustion engine, so that the operations of the combustion system is controlled.

The combustion system control device includes: a first estimation unit that estimates, as a first estimation value, at least one of the mixing ratio of each molecular structure species contained in the fuel and a property value representing a property of the fuel based on respective combustion parameters detected when combustion is performed under different combustion conditions among the combustion parameters detected by the combustion sensor; a second estimation unit that estimates, as a second estimation value, at least one of the mixing ratio and the property value based on a plurality of the property parameters detected by the property sensor; a comparison/selection unit that compares the first estimation value with the second estimation value to select an estimation value with higher estimation accuracy; and a control unit that controls operations of the combustion system by using the estimation value selected by the comparison/selection unit.

The values of the combustion parameters detected by the combustion sensor, such as an ignition delay time and a heat generation amount, differ depending on combustion conditions such as an in-cylinder pressure and an in-cylinder temperature. A difference in the combustion parameters with respect to a difference in the combustion conditions differs due to a difference in the mixing ratio of each molecular structure species contained in the fuel. For example, a property map representing the relationship between the in-cylinder pressure and the ignition delay time differs due to a difference in the mixing ratio of each of normal paraffins, isoparaffins, naphthenes, and aromatics contained in the fuel. This means that the mixing ratio of each molecular structure species can be estimated by detecting a difference in the combustion parameters depending on a difference in the combustion conditions. In short, the present inventors have obtained the knowledge that "the mixing ratio of each molecular structure species contained in fuel can be estimated from respective combustion parameters detected under different combustion conditions." The fact that the mixing ratio can be estimated as described above means that general property values of fuels, such as distillation property T50, dynamic viscosity, and density, and intermediate parameters such as average carbon number and HO ratio, can be estimated with high accuracy from the estimated mixing ratios.

According to the above disclosure, at least one of the above mixing ratio and property value is estimated, in view of these knowledge, as the first estimation value based on respective combustion parameters detected when combustion is performed under different combustion conditions among the combustion parameters detected by the combustion sensor. Herein, the above-described general property values and intermediate parameters can be mentioned as the specific examples of the above property value. Since the operation of the combustion system is controlled by using the first estimation value, the operation can be controlled with a more optimal content in accordance with the fuel, as compared with a conventional device in which the operation is controlled based on the dynamic viscosity detected by a dynamic viscosity sensor.

In addition, a combination of a plurality of types of the property parameters detected by the property sensor, such as dynamic viscosity and density, correlates with the mixing ratio. Even if there is only one type of a property parameter, a plurality of the property parameters, which differ for each condition, can be acquired when the condition under which the property parameter is detected, such as, for example, the temperature or pressure of the fuel, differs. The combination of these plural property parameters correlates with the mixing ratio. In short, the present inventors have obtained the knowledge that "the mixing ratio of each molecular structure species contained in fuel can be estimated from a plurality of the property parameters." The fact that the mixing ratio can be estimated as described above means that the general properties and intermediate parameters can be estimated with high accuracy from the estimated mixing ratio.

According to the above disclosure, at least one of the mixing ratio and the property value is estimated, in view of these knowledges, as a second estimation value based on a plurality of the property parameters detected by the property sensor. Since the operation of the combustion system is controlled by using the second estimation value, the operation can be controlled with a more optimal content in accordance with the fuel, as compared with a conventional device that controls based on the dynamic viscosity detected by a dynamic viscosity sensor.

Further, in the above disclosure, the comparison/selection unit is included so that an estimation value with higher estimation accuracy between the first estimation value and the second estimation value is selected, and the operation of the combustion system is controlled by using the selected estimation value, whereby the control with an optimal content in accordance with the fuel can be further improved.

BRIEF DESCRIPTION OF DRAWINGS

The above and other objects, characteristics, and advantages of the present disclosure will become more apparent from the following detailed description with reference to the accompanying drawings:

FIG. 1 is a view for explaining a combustion system control device according to a first embodiment of the disclosure and a combustion system of an internal combustion engine to which the device is applied;

FIG. 2 is a view for explaining an ignition delay time;

FIG. 3 is a view for explaining a relationship among a plurality of ignition delay times, combustion conditions that are a combination of combustion environment values representing flammability, and mixing amounts of various components;

FIG. 4 is a view showing a relationship between a property line representing a change in the ignition delay time caused due to an in-cylinder oxygen concentration and the molecular structure species of fuel;

FIG. 5 is a view showing a relationship between a property line representing a change in the ignition delay time caused due to an in-cylinder temperature and the molecular structure species of fuel;

FIG. 6 is a view showing a relationship between a property line specified based on an ignition delay time and the mixing ratio of a molecular structure species;

DESCRIPTION OF EMBODIMENTS

Figure 7:
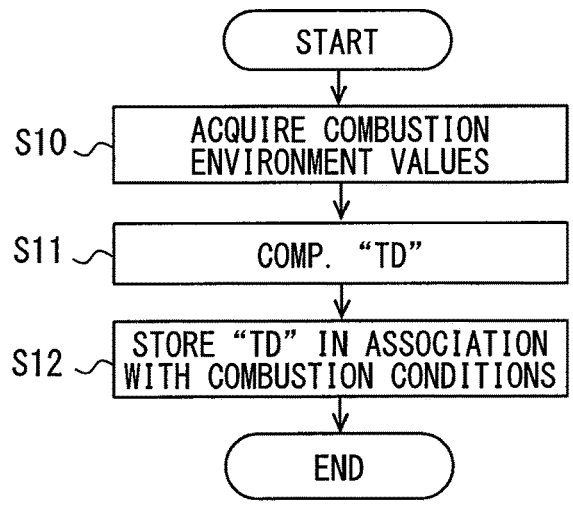
FIG. 7 is a flowchart showing a process flow of the microcomputer shown in FIG. 1, the process flow showing procedures for storing an ignition delay time.

Hereinafter, a plurality of embodiments for carrying out the invention will be described with reference to the views. In each embodiment, parts corresponding to the items described in the preceding embodiment are denoted by the same reference numerals, and duplicated description may be omitted. In each embodiment, when only part of a configuration is described, the previously described other embodiments can be referred to and applied to the other parts of the configuration.

First Embodiment

A combustion system control device according to the present embodiment is provided by an electronic control unit (ECU) 80 shown in FIG. 1. The ECU 80 includes a microcomputer 80*a*, an unshown input processing circuit and an output processing circuit, and the like. The microcomputer 80*a* includes an unshown central processing unit (CPU) and a memory 80*b*. With the CPU executing a predetermined program stored in the memory 80*b*, the microcomputer 80*a* controls the operations of a fuel injection valve 15, a fuel pump 15*p*, an EGR valve 17*a*, a temperature control valve 17*d*, a supercharging pressure regulator 26, and the like, which are included in a combustion system. Through these controls, the combustion state of an internal combustion engine 10 included in the combustion system is controlled to be a desired state. The combustion system and the ECU 80 are mounted in a vehicle, and the vehicle travels by using the output of the internal combustion engine 10 as a driving source.

The internal combustion engine 10 includes a cylinder block 11, a cylinder head 12, a piston 13, and the like. An intake valve 14*in*, an exhaust valve 14*ex*, the fuel injection valve 15, and an in-cylinder pressure sensor 21 forming a combustion sensor are attached to the cylinder head 12. A density sensor 27 for detecting the density of fuel and a dynamic viscosity sensor 28 for detecting the dynamic viscosity of fuel are attached to a portion forming a fuel passage such as a common rail 15*c* or to a fuel tank. The fuel density detected by the density sensor 27 and the dynamic viscosity detected by the dynamic viscosity sensor 28 correspond to property parameters representing the properties of fuel, and these sensors correspond to property sensors for detecting the property parameters.

The fuel pump 15*p* pumps the fuel in the fuel tank to the common rail 15*c*. The fuel in the common rail 15*c* is stored therein in a state in which the pressure of which is maintained at a target pressure Ptrg with the ECU 80 controlling the operation of the fuel pump 15*p*. The common rail 15*c* distributes the accumulated fuel to the fuel injection valve 15 of each cylinder. The fuel injected from the fuel injection valve 15 mixes with the intake air in a combustion chamber 11*a* to form an air-fuel mixture, and the air-fuel mixture is compressed by the piston 13 and self-ignites. The internal combustion engine 10 is a compression self-ignition type diesel engine, and light oil is used as fuel.

The fuel injection valve 15 is configured by accommodating, in the body, an electromagnetic actuator and a valve body. When the ECU 80 powers on the electromagnetic actuator, the electromagnetic attraction force of the electromagnetic actuator opens a leak passage of an unshown back pressure chamber, and the valve body opens with a decrease in back pressure and an injection hole formed in the body is opened, whereby fuel is injected from the injection hole. When the electromagnetic actuator is powered off, the valve body closes, whereby the fuel injection is stopped.

The fuel pump 15*p* has a structure having a piston 15*p*1 and a cylinder 15*p*2, and in the case of a structure in which the piston 15*p*1 pumps fuel, an outer peripheral portion S1 of the piston 15*p*1 corresponds to a sliding portion that slides with the inner peripheral surface of the cylinder 15*p*2. The fuel injection valve 15 has a structure in which a valve body that opens and closes the injection hole is accommodated in the body, and an outer peripheral portion S2 of the valve body corresponds to a sliding portion that slides with the inner peripheral surface of the body. In such a sliding portion, fuel functions as a lubricant.

An intake pipe 16*in* and an exhaust pipe 16*ex* are respectively connected to an intake port 12*in* and an exhaust port 12*ex* formed in the cylinder head 12. An EGR pipe 17 is connected to each of the intake pipe 16*in* and the exhaust pipe 16*ex*, so that EGR gas that is part of exhaust gas flows (refluxes) into the intake pipe 16*in* through the EGR pipe 17. An EGR valve 17*a* is attached to the EGR pipe 17. The aperture of the EGR pipe 17 is controlled with the ECU 80 controlling the operation of the EGR valve 17*a*, whereby the flow rate of the EGR gas is controlled.

In addition, an EGR cooler 17*b* for cooling the EGR gas, a bypass pipe 17*c*, and a temperature control valve 17*d* are attached to the upstream portion of the EGR valve 17*a* of the EGR pipe 17. The bypass pipe 17*c* forms a bypass flow path through which the EGR gas bypasses the EGR cooler 17*b*. The temperature control valve 17*d* adjusts a ratio between the EGR gas flowing through the EGR cooler 17*b* and the EGR gas flowing through the bypass flow path and finally adjusts the temperature of the EGR gas flowing into the intake pipe 16*in* by adjusting the aperture of the bypass flow path. The intake air flowing into the intake port 12*in* contains external air (fresh air) flowing into from the intake pipe 16*in* and the EGR gas. Therefore, adjusting the temperature of the EGR gas by the temperature control valve 17*d* corresponds to adjusting an intake manifold temperature that is the temperature of the intake air flowing into the intake port 12*in*.

The combustion system includes an unshown supercharger. The supercharger has a turbine to be attached to the exhaust pipe 16*ex* and a compressor to be attached to the intake pipe 16*in*. When the turbine rotates by the flow velocity energy of the exhaust, the compressor rotates by the rotational force of the turbine, whereby the fresh air is compressed or supercharged by the compressor. The above-described supercharging pressure regulator 26 is a device for changing the capacity of the turbine, and the turbine capacity is adjusted with the ECU 80 controlling the operation of the supercharging pressure regulator 26, whereby the supercharging pressure by the compressor is controlled.

Detection signals detected by various sensors, such as the in-cylinder pressure sensor 21, an oxygen concentration sensor 22, a rail pressure sensor 23, a crank angle sensor 24, and an accelerator pedal sensor 25, are inputted to the ECU 80.

The in-cylinder pressure sensor 21 outputs a detection signal corresponding to the pressure (in-cylinder pressure) of the combustion chamber 11*a*. The in-cylinder pressure sensor 21 has a temperature detection element 21*a* in addition to a pressure detection element, and also outputs a detection signal corresponding to the temperature (in-cylinder temperature) of the combustion chamber 11*a*. The oxygen concentration sensor 22 is attached to the intake pipe 16*in*, and outputs a detection signal corresponding to the oxygen concentration of the intake air. The intake air to be detected is a mixture of fresh air and the EGR gas. The rail pressure sensor 23 is attached to the common rail 15*c*, and outputs a detection signal corresponding to the pressure (rail pressure) of the accumulated fuel. The crank angle sensor 24 outputs a detection signal corresponding to the rotation speed of a crankshaft rotationally driven by the piston 13, that is, to the rotation number (engine rotation number) of the crankshaft per unit time. The accelerator pedal sensor 25 outputs a detection signal corresponding to the depression amount (engine load) of an accelerator pedal to be depressed by a vehicle driver.

Based on these detection signals, the ECU 80 controls the operations of the fuel injection valve 15, the fuel pump 15*p*, the EGR valve 17*a*, the temperature control valve 17*d*, and the supercharging pressure regulator 26. Thereby, a fuel injection start timing, an injection amount, an injection pressure, an EGR gas flow rate, an intake manifold temperature, and a supercharging pressure are controlled.

The microcomputer 80*a*, while controlling the operation of the fuel injection valve 15, functions as an injection control unit 85*a* that controls a fuel injection start timing, an injection amount, and the number of injection stages related to multi-stage injection. The microcomputer 80*a*, while controlling the operation of the fuel pump 15*p*, functions as a fuel pressure control unit 85*b* that controls an injection pressure. The microcomputer 80*a*, while controlling the operation of the EGR valve 17*a*, functions as an EGR control unit 85*c* that controls an EGR gas flow rate. The microcomputer 80*a*, while controlling the operation of the supercharging pressure regulator 26, functions as a supercharging pressure control unit 85*d* that controls a supercharging pressure. The microcomputer 80*a*, while controlling the operation of the temperature control valve 17*d*, functions as an intake manifold temperature control unit 85*e* that controls an intake manifold temperature. These control units provide a control unit that controls the operation of the combustion system.

The microcomputer 80*a* also functions as a combustion parameter acquisition unit 81 that acquires a detected value (combustion parameter) of a physical quantity related to combustion. The combustion parameter according to the present embodiment is an ignition delay time TD shown in FIG. 2. The upper graph in FIG. 2 shows a pulse signal outputted from the microcomputer 80a. Powering the fuel injection valve 15 is controlled in accordance with the pulse signal. Specifically, the powering is started at a pulse-on timing t1, and is continued for a pulse-on period Tq. In short, an injection start timing is controlled by a pulse-on timing. In addition, an injection period is controlled by the pulse-on period Tq, which finally controls an injection amount.

The middle graph in FIG. 2 shows a change in the injection state of fuel from the injection hole, the change being generated as a result of the fact that the valve body opens and closes in accordance with the pulse signal. Specifically, a change in the injection amount (injection rate) of fuel injected per unit time is shown. As shown in the graph, there is a time lag between the timing t1 at which the powering is started and a timing t2 at which injection is actually started. There is also a time lag between a timing at which the powering is ended and a timing at which the injection is actually stopped. A period Tq1 for which the injection is actually being performed is controlled by the pulse-on period Tq.

The lower graph in FIG. 2 shows a change in the combustion state of the injected fuel in the combustion chamber 11a. Specifically, a change in a heat amount (heat generation rate) per unit time is shown, the change being caused with a mixture of the injected fuel and the intake air self-igniting and burning. As shown in the graph, there is a time lag between the timing t2 at which the injection is started and a timing t3 at which combustion is actually started. In the present embodiment, the time between the timing t1 at which powering is started and the timing t3 at which combustion is started is defined as the ignition delay time TD.

The combustion parameter acquisition unit 81 estimates the timing t3 at which the combustion is started based on a change in the in-cylinder pressure detected by the in-cylinder pressure sensor 21. Specifically, a timing at which the in-cylinder pressure suddenly rises during a period for which a crank angle rotates by a predetermined amount after the piston 13 reaches a top dead center, is estimated as a combustion start timing (timing t3). The ignition delay time TD is calculated by the combustion parameter acquisition unit 81 based on this estimation result. The combustion parameter acquisition unit 81 further acquires various states (combustion conditions) during combustion for each combustion. Specifically, at least one of an in-cylinder pressure, an in-cylinder temperature, an intake oxygen concentration, an injection pressure, and air-fuel mixture flow velocity is acquired as a combustion environment value.

These combustion environment values are parameters representing the flammability of fuel, and it can be said that each of the in-cylinder pressure just before combustion, the in-cylinder temperature just before combustion, the intake oxygen concentration, the injection pressure, and the air-fuel mixture flow velocity increases to a higher level, the air-fuel mixture is more likely to self-ignite and burn. As the in-cylinder pressure and in-cylinder temperature just before combustion, for example, the values, detected at the timing t1 at which powering the fuel injection valve 15 is started, may be used. The in-cylinder pressure is detected by the in-cylinder pressure sensor 21, the in-cylinder temperature by the temperature detection element 21a, the intake oxygen concentration by the oxygen concentration sensor 22, and the injection pressure by the rail pressure sensor 23. The air-fuel mixture flow velocity is the flow velocity of the air-fuel mixture in the combustion chamber 11a just before combustion. Since this flow velocity becomes higher as the engine rotation number becomes larger, it is calculated based on the engine rotation number. The combustion parameter acquisition unit 81 stores the acquired ignition delay time TD in the memory 80b in association with a combination (combustion conditions) of the combustion environment values related to the combustion.

The microcomputer 80a estimates the mixing ratio of each of a plurality of types of molecular structure species contained in the fuel, based on a plurality of combustion parameters detected under different combustion conditions. The microcomputer 80a, while executing this estimation, corresponds to a first estimation unit 81a that estimates the mixing ratio based on the combustion parameters detected by the in-cylinder pressure sensor 21.

The mixing amounts of various components are calculated, for example, by substituting the ignition delay times TD for respective different combustion conditions into the determinant shown in FIG. 3. Herein, the mixing ratio of each component is calculated by dividing each calculated mixing amount by the total amount.

The matrix on the left side of FIG. 3 is x rows and 1 column, and the numerical values of this matrix represent the mixing amounts of various components. The various components are components classified according to the types of molecular structures. The types of the molecular structures include normal paraffins, isoparaffins, naphthenes, and aromas.

The matrix on the left side of the right side is x rows and y columns, and the numerical values of this matrix represent constants determined based on the experiments carried out beforehand. The matrix on the right side of the right side is y rows and 1 column, and the numerical values of this matrix represent the ignition delay times TD acquired by the combustion parameter acquisition unit 81. For example, the numerical value of the first row and first column is the ignition delay time TD (condition i) acquired under a combustion condition i including a predetermined combination of the combustion environment values, and the numerical value of the second row and first column is the ignition delay time TD (condition j) acquired under a combustion condition j. Between the combustion conditions i and j, all of the combustion environment values are set to be different from each other. In the following description, an in-cylinder pressure, an in-cylinder temperature, an intake oxygen concentration, and an injection pressure related to the combustion condition i are set to P (condition i), T (condition i), $O_2$ (condition i), and Pc (condition i), respectively. An in-cylinder pressure, an in-cylinder temperature, an intake oxygen concentration, and an injection pressure related to the combustion condition j are set to P (condition j), T (condition j), $O_2$ (condition j), and Pc (condition j), respectively.

Next, the theory that the mixing ratio of each molecular structure species can be calculated by substituting the ignition delay times TD for respective combustion conditions into the determinant of FIG. 3 will be described with reference to FIGS. 4, 5, and 6.

As the concentration of oxygen (in-cylinder oxygen concentration) contained in an air-fuel mixture related to combustion is higher, the mixture is more likely to self-ignite, and hence the ignition delay time TD becomes shorter, as shown in FIG. 4. Three solid lines (1), (2), and (3) in the view are property lines each showing the relationship between the in-cylinder oxygen concentration and the ignition delay time TD. However, this property line differs depending on fuel. Strictly speaking, this property line differs depending on the mixing ratio of each molecular structure species contained in fuel. Therefore, by detecting the ignition delay time TD occurring when the in-cylinder oxygen concentration is $O_2$ (condition i), it can be estimated which molecular structure species is contained. In particular, by comparing the ignition delay time TD occurring when the in-cylinder oxygen concentration is $O_2$ (condition i) with the ignition delay time TD occurring when the in-cylinder oxygen concentration is $O_2$ (condition j), the mixing ratio can be estimated with higher accuracy.

Similarly, as the in-cylinder temperature is higher, the air-fuel mixture is more likely to self-ignite, and hence the ignition delay time TD becomes shorter, as shown in FIG. 5. Three solid lines (1), (2), and (3) in the view are property lines each showing the relationship between the in-cylinder temperature and the ignition delay time TD. However, this property line differs depending on fuel, and strictly speaking, it differs depending on the mixing ratio of each molecular structure species contained in fuel. Therefore, by detecting the ignition delay time TD occurring when the in-cylinder temperature is B1, it can be estimated which molecular structure species is contained. In particular, by comparing the ignition delay time TD occurring when the in-cylinder temperature is T (condition i) with the ignition delay time TD occurring when the in-cylinder temperature is T (condition j), the mixing ratio can be estimated with higher accuracy.

Similarly, as the injection pressure is higher, oxygen is more likely to be taken in and the air-fuel mixture is more likely to self-ignite, and hence the ignition delay time TD becomes shorter. Strictly speaking, a sensitivity differs depending on the mixing ratio of each molecular structure species contained in fuel. Therefore, by detecting the ignition delay time TD occurring when the injection pressure is different, the mixing ratio can be estimated with higher accuracy.

In addition, a molecular structure species having a high influence on the property line related to the in-cylinder oxygen concentration (see FIG. 4) is different from a molecular structure species having a high influence on the property line related to the in-cylinder temperature (see FIG. 5). Thus, molecular structure species having high influences on the property lines each related to each of a plurality of combustion conditions are different from each other. Therefore, based on a combination of the ignition delay times TD acquired by setting a combination of a plurality of the combustion environment values (combustion conditions) to different values, it can be estimated with high accuracy which molecular structure species is mixed in a large amount, as shown in, for example, FIG. 6. In the following description, the in-cylinder oxygen concentration is referred to as a first combustion environment value, the in-cylinder temperature as a second combustion environment value, and a property line related to the first combustion environment value as a first property line, and a property line related to the second combustion environment value as a second property line.

A molecular structure species A shown in FIG. 6 is one having a high influence on a property line (hereinafter referred to as the first property line) related to the in-cylinder oxygen concentration as the first combustion environment value. A molecular structure species B is one having a high influence on a property line (hereinafter referred to as the second property line) related to the in-cylinder temperature as the second combustion environment value, and a molecular structure species C is one having a high influence on a third property line related to a third combustion environment value. It can be said that as a change in the ignition delay time TD becomes larger with respect to a change in the first combustion environment value, a larger amount of the molecular structure species A is mixed. Similarly, it can be said that as a change in the ignition delay time TD becomes larger with respect to a change in the second combustion environment value, a larger amount of the molecular structure species B is mixed, and it can be said that as a change in the ignition delay time TD becomes larger with respect to a change in the third combustion environment value, a larger amount of the molecular structure species C is mixed. Therefore, the mixing ratios of the molecular structure species A, B, and C can be estimated for each of the different fuels (1), (2), and (3).

FIG. 7 is a flowchart showing processing procedures of a program to be executed by the combustion parameter acquisition unit 81. This processing is executed each time when the below-described pilot injection is commanded. Injection may be controlled such that fuel is injected from the same fuel injection valve 15 more than once (multi-stage injection) during one combustion cycle. Of these multiple times of injections, the injection in which the largest injection amount is set is referred to as main injection, and the injection just before that as pilot injection.

First, a plurality of the combustion environment values are acquired in Step S10 in FIG. 7, as described above. Next, the combustion start timing t3 is estimated in Step S11 based on the value detected by the in-cylinder pressure sensor 21 to calculate the ignition delay time TD related to the pilot injection, as described above. Next, the ignition delay time TD calculated in Step S11 is stored, in Step S12, in the memory 80*b* in association with the plurality of the combustion environment values (combustion conditions) acquired in Step S10.

Specifically, a numerical range within which each combustion environment value can fall is divided into a plurality of regions, so that combinations of the regions of a plurality of the combustion environment values are preset. For example, the ignition delay time TD (i) shown in FIG. 3 represents the ignition delay time TD acquired when the regions of P(i), T(i), $O_2$(i), and Pc(i) are combined. Similarly, the ignition delay time TD(j) represents the ignition delay time TD acquired when the regions of P(j), T(j), $O_2$(j), and Pc(j) are combined. In Step S12, it is determined which of the preset combinations (combustion conditions) the combination of a plurality of the combustion environment values acquired in Step S10 corresponds to. Then, the ignition delay time TD calculated in Step S11 is stored as the ignition delay time TD corresponding to the combustion conditions concerned. That is, the ignition delay time TD is stored in association with the combustion conditions concerned.

However, one or more of the preset combustion conditions may not correspond to the combustion conditions acquired in Step S10. In this case, the processing in FIG. 7 is terminated without storing the ignition delay time TD in the memory 80*b*.

Figure 8:
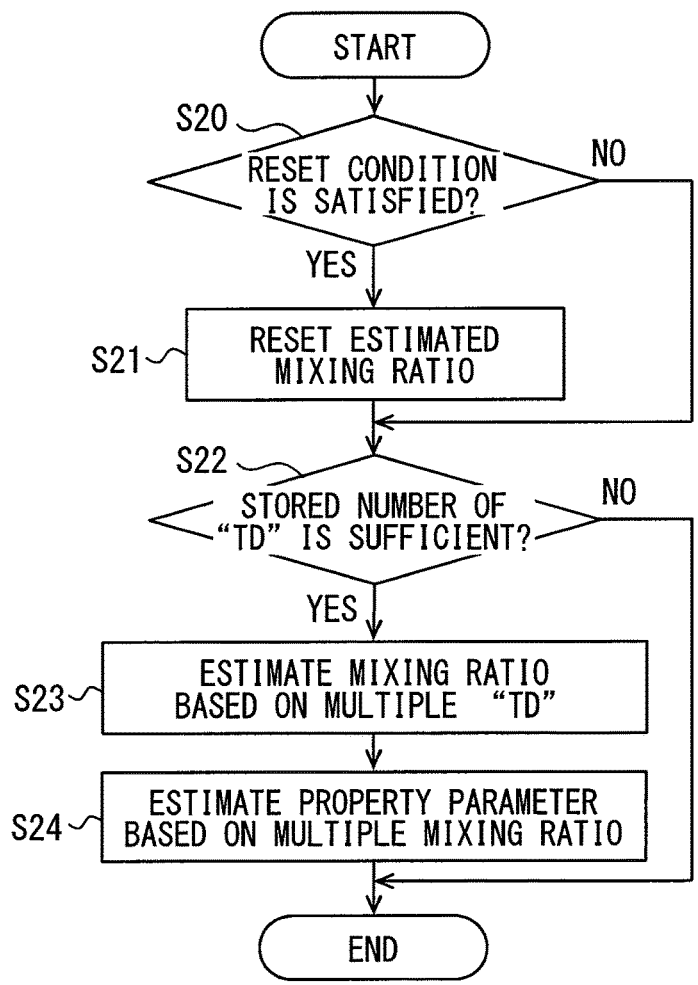
FIG. 8 is a flowchart showing a process flow of the microcomputer shown in FIG. 1, the process flow showing procedures for the estimation of the mixing ratio of each molecular structure species.

FIG. 8 is a flowchart showing processing procedures of a program executed by the first estimation unit 81*a*. This processing is repeatedly executed at predetermined intervals by the microcomputer 80*a* during the operation period of the internal combustion engine 10. First, when there is a high possibility that another fuel may have mixed with the fuel stored in the fuel tank when a user has supplied the fuel, it is assumed that the mixing ratios of molecular structure species have been changed, and it is determined in Step S20 in FIG. 8 that a reset condition is satisfied. For example, when an increase in remaining fuel amount is detected, during the stop of the operation of the internal combustion engine 10, by a sensor that detects a remaining fuel amount in the fuel tank, it is determined that a reset condition is satisfied.

When it is determined that a reset condition is satisfied, the value of the estimated mixing ratio is reset in the following Step S21. In this reset, the value of the latest mixing ratio estimated in the later-described Step S23 is reset, and the value of the ignition delay time TD stored in the processing in FIG. 7 is also reset. Therefore, the ignition delay times TD stored in the memory 80b are accumulated during a period between when the last time reset condition is satisfied and when the next reset condition is satisfied.

In the following Step S22, it is determined whether the number of the ignition delay times TD (number of samples) stored in the memory 80b is sufficient to estimate the mixing ratios of molecular structure species. Specifically, when the number of the samples accumulated in the memory 80b is equal to or larger than a preset number, it is determined that the number of samples is sufficient. Alternatively, when the ignition delay times TD are stored for a plurality of preset combustion conditions among the combinations (combustion conditions) of the regions to be stored, it is determined that the number of samples is sufficient.

When it is determined that the number of samples is sufficient, the mixing amount of each molecular structure species is calculated in the following Step S23 by substituting the sampled ignition delay times TD into the determinant of FIG. 3. Then, the mixing ratio of each molecular structure species is calculated based on the mixing amount of each molecular structure species that has been thus calculated.

As described above, the microcomputer 80a also functions as the injection control unit 85a, the fuel pressure control unit 85b, and the EGR control unit 85c. The injection control unit 85a controls an injection start timing, an injection amount, and the number of injection stages by setting the pulse signal in FIG. 2 such that the injection start timing, the injection amount, and the number of injection stages become target values (injection control). The number of injection stages means the number of injection related to the above-described multi-stage injection.

The fuel pressure control unit 85b controls the operation of a metering valve that controls the flow rate of the fuel sucked into the fuel pump 15p. Specifically, the operation of the metering valve is feedback-controlled based on a deviation between the actual rail pressure detected by the rail pressure sensor 23 and a target pressure Ptrg (target value). As a result, a discharge amount per unit time, the discharge being performed by the fuel pump 15p, is controlled, and the operation of the metering valve is controlled such that the actual rail pressure becomes the target value (fuel pressure control). The EGR control unit 85c controls the aperture of the EGR valve 17a such that an EGR amount becomes a target value (EGR control).

Returning to the description of FIG. 1, the microcomputer 80a also functions as a property parameter acquisition unit 82 that acquires a physical quantity (property parameter) representing the property of fuel. Specific examples of the property parameter include the dynamic viscosity, density, HO ratio, lower calorific value, and the like of fuel. The HO ratio means a ratio of the amount of hydrogen to the amount of carbon contained in fuel. The lower calorific value means a calorific value that can be converted into the kinetic energy of the piston 13. Herein, steam is produced by combustion, and when it is considered that the steam is produced from the state of water, the heat of vaporization also adds to the calorific value, and the heat amount obtained by adding this heat of vaporization to the lower calorific value is referred to as a higher calorific value.

The property parameter acquisition unit 82 acquires the density of fuel from the density sensor 27 as the property parameter and acquires the dynamic viscosity from the dynamic viscosity sensor 28 as the property parameter. The density sensor 27 detects the density of fuel based on, for example, a natural vibration period measuring method. The dynamic viscosity sensor 28 is, for example, a thin tube viscometer or a dynamic viscometer based on a thin wire heating method. The fuel to be detected by the density sensor 27 and the dynamic viscosity sensor 28 is the fuel in the fuel passage such as the common rail 15c or the fuel in the fuel tank. The density sensor 27 and the dynamic viscosity sensor 28 include a heater 28a shown in FIG. 1, and detect the density and the dynamic viscosity of the fuel, respectively, with the fuel heated to a predetermined temperature by the heater 28a.

Herein, the present inventors have paid attention to the fact that: a specific property parameter of fuel correlates with the mixing amount of each molecular structure species contained in the fuel; and a sensitivity to the mixing amount of each molecular structure species differs for each property parameter type. In other words, when a molecular structure is different in fuel, bonding force between molecules, steric hindrance due to structure, interaction, and the like differ. In addition, fuel contains a plurality of types of molecular structures, and the mixing amounts thereof differ from fuel to fuel. In this case, it is considered that a sensitivity contributing to a property parameter differs for each molecular structure species, and hence the value of a property parameter changes depending on the amount of a molecular structure.

Figure 9:
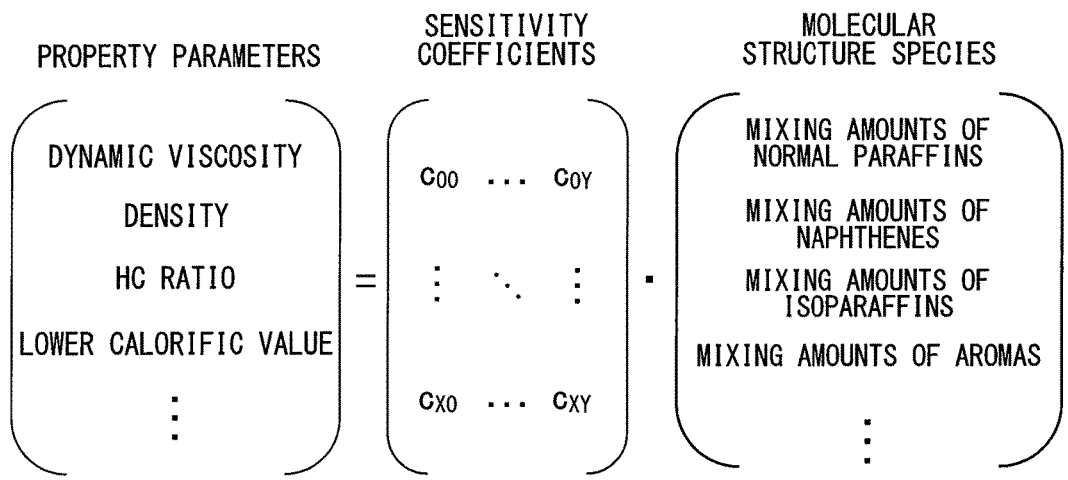
FIG. 9 is a view for explaining a relationship among a plurality of property parameters, mixing amounts of molecular structure species, and sensitivity coefficients.

Therefore, the present inventors have established the correlation equation shown in FIG. 9 for the property parameters and the molecular structures. This correlation equation is an arithmetic expression of a property calculation model by which a plurality of property parameters are derived by using sensitivity coefficients indicating degrees of dependence of the amounts of a plurality of molecular structures on a plurality of the property parameters to reflect the sensitivity coefficients on the amounts of the molecular structures. In the correlation equation shown in FIG. 9, "c" is a sensitivity coefficient indicating, in estimating each property parameter, the sensitivity (degree of involvement) of each molecular structure, and it is determined as a real number depending on the correlation between a property parameter and a molecular structure. However, some of a plurality of the sensitivity coefficients may be 0.

Figure 10:
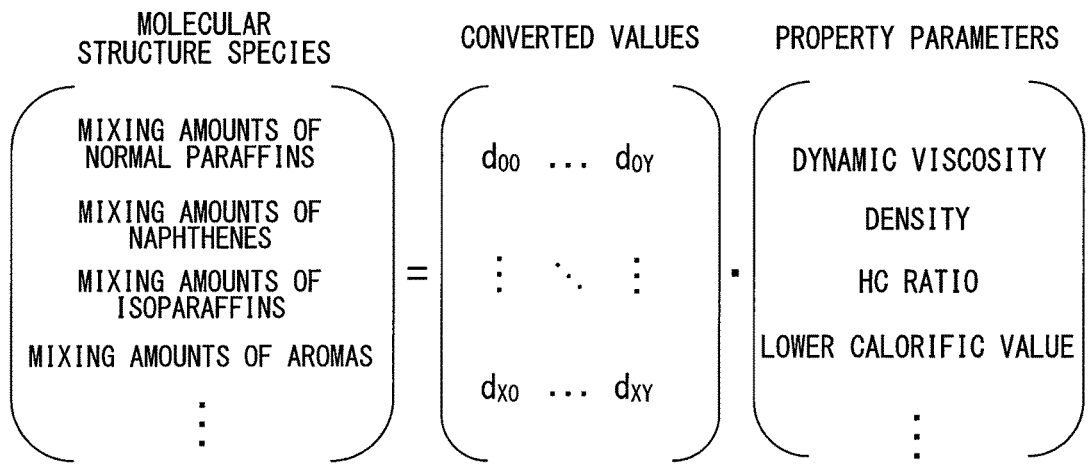
FIG. 10 is a view for explaining a relationship among mixing amounts of molecular structure species, a plurality of property parameters, and converted values.

When the mixing amount of each molecular structure species is expressed by an inverse matrix of the correlation equation in FIG. 9, the correlation equation shown in FIG. 10 is obtained. In this correlation equation, the mixing amount of each molecular structure species contained in the fuel can be calculated by inputting the values of a plurality of the property parameters. In this case, it is also possible: to specify a molecular structure to be calculated among a plurality of types of molecular structures; and to validate only a converted value b of a property parameter necessary for the calculation of the mixing amount of the molecular structure. For example, for a property parameter unnecessary for the calculation of the mixing amount, it is good to set a converted value b corresponding to the property parameter to 0. The converted value b is also a weighting amount for each property parameter. The correlation equation in FIG. 10 is a parameter arithmetic expression in which the property calculation model of the correlation equation in FIG. 9 is expressed by an inverse model.

The dynamic viscosity and density of fuel are information that can be measured by the density sensor 27 and the dynamic viscosity sensor 28, which can be acquired as necessary in using a vehicle such as an automobile. In addition, the low calorific value correlates with the dynamic viscosity and density of fuel, and hence the low calorific value can be calculated based on the dynamic viscosity and density by using a map or an arithmetic expression showing the correlation. Since the HO ratio correlates with the lower calorific value, the HO ratio can be calculated based on the lower calorific value by using a map or an arithmetic expression showing the correlation. Other than those, a parameter related to cetane number or distillation properties can also be used as the property parameter.

The mixing amount of each molecular structure species is calculated by substituting the values of these property parameters into the arithmetic expression in FIG. 10. The mixing ratio of each component is calculated by dividing each calculated mixing amount by the total amount. As described above, the microcomputer 80a estimates the mixing ratio of each molecular structure species among a plurality of types of molecular structure species contained in the fuel based on a plurality of property parameters. The microcomputer 80a, while executing this estimation, corresponds to a second estimation unit 82a that estimates a mixing ratio based on the property parameters detected by the density sensor 27 and the dynamic viscosity sensor 28.

The property parameters such as the dynamic viscosity and density, detected by the property sensors such as the density sensor 27 and the dynamic viscosity sensor 28, differ depending on the temperature or pressure of the fuel to be detected. A difference in the property parameter with respect to a difference in the temperature or pressure of the fuel differs due to a difference in the mixing ratio of each molecular structure species contained in the fuel. For example, a property map representing the relationship between the temperature or pressure and the dynamic viscosity of the fuel differs due to a difference in the mixing ratio of each of normal paraffins, isoparaffins, naphthenes, and aromatics contained in the fuel. This means that the mixing ratio of each molecular structure spices can be estimated by detecting a difference in the property parameter depending on a difference in the temperature or pressure of the fuel. In short, the present inventors have obtained the knowledge that "the mixing ratio of each molecular structure species contained in the fuel can be estimated from respective property parameters detected at different temperatures or pressures."

In view of this knowledge, the second estimation unit 82a substitutes the property parameters detected at different temperatures or pressures into the matrices of the property parameters shown in FIGS. 9 and 10, in estimating a mixing ratio based on a plurality of property parameters. That is, the second estimation unit 82a estimates a mixing ratio based on a plurality of property parameters detected under different conditions.

Specifically, the density sensor 27 and the dynamic viscosity sensor 28 are provided with the heater 28a that generates heat when powered. The temperature condition of the fuel is change by changing the heating condition of the heater 28a, so that the density and dynamic viscosity of the fuel are detected under each temperature condition. In this case, the arithmetic expressions shown in FIGS. 9 and 10 are established by using the densities and dynamic viscosities of the fuel detected under different temperature conditions as the property parameters, whereby the above mixing ratio is calculated by using the model arithmetic expressions.

Returning to the description of FIG. 8, after a mixing ratio is estimated in Step S23, the mixing ratio estimated in Step S23 is substituted, in Step S24, into the correlation equation of FIG. 9, whereby a plurality of types of property parameters are calculated. The microcomputer 80a, while executing the processing of Step S24, corresponds to an estimation unit that estimates a property parameter based on respective combustion parameters detected under different combustion conditions.

Figure 11:
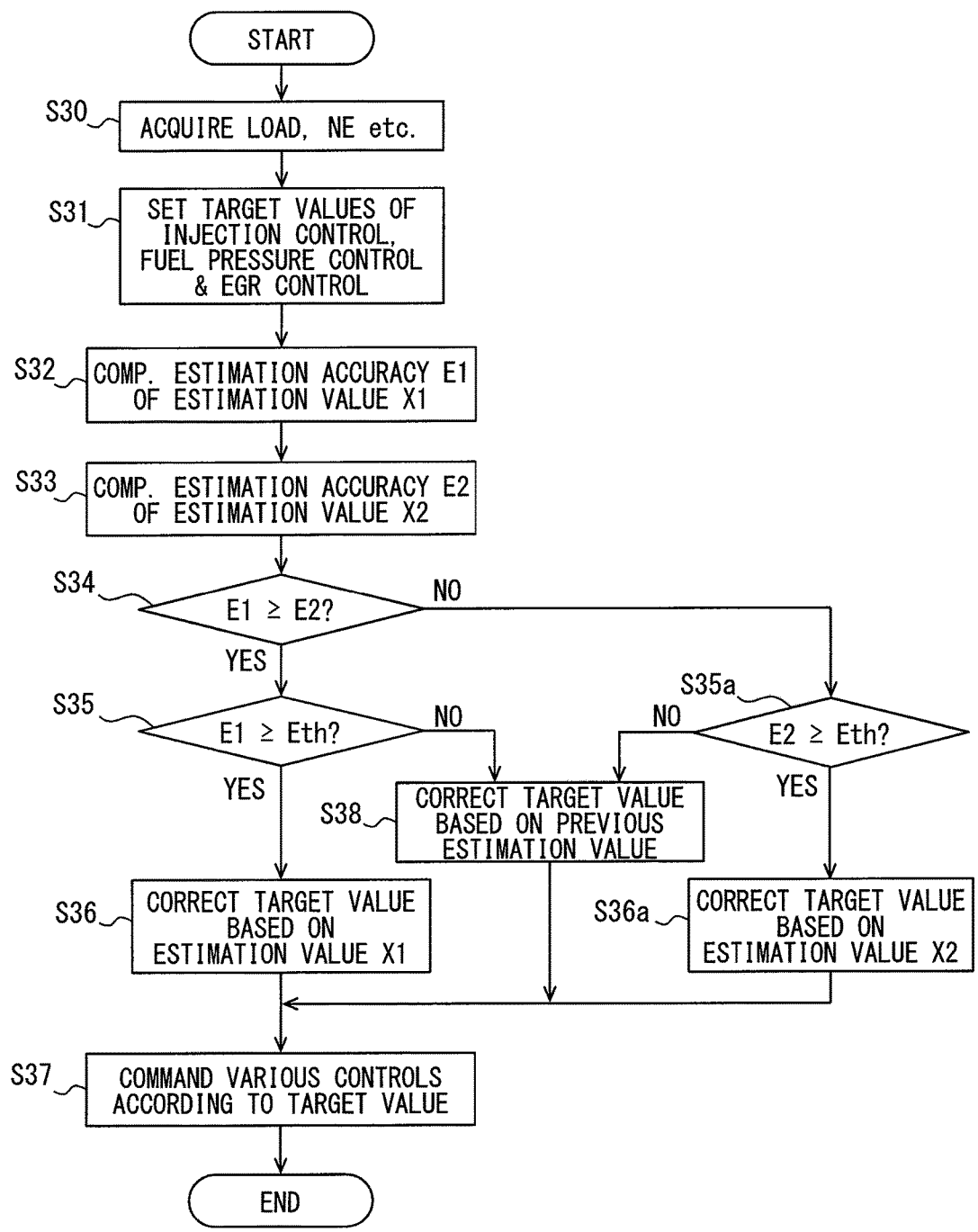
FIG. 11 is a flowchart showing a process flow of the microcomputer shown in FIG. 1, the process flow showing procedures for controlling a combustion system.

FIG. 11 is a flowchart showing processing procedures of programs executed by the injection control unit 85a, the fuel pressure control unit 85b, and the EGR control unit 85c. This processing is repeatedly executed at predetermined intervals by the microcomputer 80a during the operation period of the internal combustion engine 10. First, the engine rotation number, an engine load, the temperature of engine cooling water, and the like are acquired in Step S30 in FIG. 11. In the following Step S31, the above-described various target values related to the injection control by the injection control unit 85a, the fuel pressure control by the fuel pressure control unit 85b, and the EGR control by the EGR control unit 85c are set based on the various values acquired in Step S30.

In the following Step S32, estimation accuracy (hereinafter referred to as first estimation accuracy E1) for the mixing ratio estimated in Step S23 in FIG. 8 (estimated by the first estimation unit 81a) is calculated. The microcomputer 80a, while executing this calculation, corresponds to a first accuracy calculation unit.

As described above, the mixing ratio is estimated based on respective combustion parameters detected when combustion is performed under different combustion conditions, among the combustion parameters detected by the in-cylinder pressure sensor 21 that is a combustion sensor. Therefore, as the number of samples of the combustion parameters to be used for the estimation by the first estimation unit 81a is larger, the estimation accuracy should be higher. In view of this, the first accuracy calculation unit calculates, in Step S32, the estimation accuracy E1 to have a higher value, as the number of samples is larger.

Specifically, when the combustion conditions include the in-cylinder pressure, the in-cylinder temperature, the intake oxygen concentration, and the injection pressure, a plurality of combustion conditions are determined beforehand by combinations of the values of respective combustion conditions (combustion environment values). For example, the case where the following three combustion conditions are determined beforehand will be described below. A first combustion condition is determined beforehand in which the in-cylinder temperature is 750 K, the intake oxygen concentration is 15%, and the injection pressure is 40 MPa. A second combustion condition is determined beforehand in which the in-cylinder temperature is 850 K, the intake oxygen concentration is 17%, and the injection pressure is 50 MPa. A third combustion condition is determined beforehand in which the in-cylinder temperature is 850 K, the intake oxygen concentration is 17%, and the injection pressure is 60 MPa.

When a combustion environment value, detected when combustion is actually performed, falls within a range including a combustion environment value determined beforehand by the combustion condition, a combustion parameter obtained in the combustion, that is, the ignition delay time TD is determined as a sample to be used for the calculation of a first estimation value X1. As the number of these samples is larger, the calculation accuracy of the first estimation value X1 is higher. The first estimation accuracy E1 is calculated, for example, by multiplying the number of samples by a predetermined coefficient. On the other hand, when a combustion environment value does not fall within the above range, the value is not suitable for a sample, and hence the ignition delay time TD in this case is not used for the calculation of the first estimation value X1.

In the following Step S33, estimation accuracy (hereinafter referred to as second estimation accuracy E2) for the mixing ratio estimated by the second estimation unit 82a is calculated. The microcomputer 80a, while executing this calculation, corresponds to a second accuracy calculation unit.

As described above, a mixing ratio is estimated based on respective property parameters detected under different temperature conditions among the property parameters detected by the density sensor 27 and the dynamic viscosity sensor 28 that are property sensors. Therefore, as the number of samples of the property parameters to be used for the estimation by the second estimation unit 82a is larger, the estimation accuracy should be higher. In view of this, the second accuracy calculation unit calculates, in Step S33, the estimation accuracy E2 to have a higher value, as the number of samples is larger.

Specifically, respective property parameters such as a dynamic viscosity, density, HC ratio, and lower calorific value are acquired at each predetermined fuel temperature. The above respective property parameters are acquired, for example, in respective cases where the fuel temperatures are 10° C., 20° C., and 30° C.

When the actual fuel temperature falls within a range including a preset fuel temperature, the property parameters obtained at the fuel temperature are used as samples to be used for the calculation of the second estimation value X2. As the number of samples is larger, the calculation accuracy of the second estimation value X2 is higher. The second estimation accuracy E2 is calculated, for example, by multiplying the number of samples by a predetermined coefficient. On the other hand, when the actual fuel temperature does not fall within the above range, the property parameters obtained in this case are not suitable for the samples, and hence they are not used for the calculation of the second estimation value X2.

In the following Step S34, the first estimation accuracy E1 is compared with the second estimation accuracy E2. When it is determined that the first estimation accuracy E1 is equal to or higher than the second estimation accuracy E2, the estimation value by the first estimation unit 81a (hereinafter referred to as the first estimation value X1) is regarded as having accuracy equal to or higher than the estimation value by the second estimation unit 82a (hereinafter referred to as the second estimation value X2). In this case, it is determined in the following Step S35 whether the first estimation accuracy E1 satisfies predetermined accuracy Eth. When it is determined that the predetermined accuracy Eth is satisfied, the various target values set in Step S31 are corrected, in the following Step S36, in accordance with the estimation value (hereinafter referred to as the first estimation value X1) of each mixing ratio estimated by the first estimation unit 81a. For example, at least one of various target values related to the injection control, the fuel pressure control, and the EGR control is corrected in accordance with which of the fuels (1), (2) and (3) shown in FIG. 6. In the following Step S37, command signals for executing the injection control, the fuel pressure control, and the EGR control are outputted according to the target values corrected in Steps S36, S36a, and S38.

When it is determined in Step S34 that the first estimation accuracy E1 is lower than the second estimation accuracy E2, the first estimation value X1 is regarded as having accuracy lower than the second estimation value X2. In this case, it is determined in the following Step S35a whether the second estimation accuracy E2 satisfies the predetermined accuracy Eth. When it is determined that the predetermined accuracy Eth is satisfied, various target values are corrected, in the following Step S36a, in accordance with the second estimation value X2 in the same way as in Step S36.

When it is determined that neither the first estimation accuracy E1 nor the second estimation accuracy E2 satisfies the predetermined accuracy Eth, that is, when it is determined in Step S35 or Step S35a that the predetermined accuracy Eth is not satisfied, the processing proceeds to Step S38. In this Step S38, the above target values are corrected by using the first estimation value X1 or the second estimation value X2 used most recently in the past, that is, by using the estimation value used in the previous correction.

Figure 12:
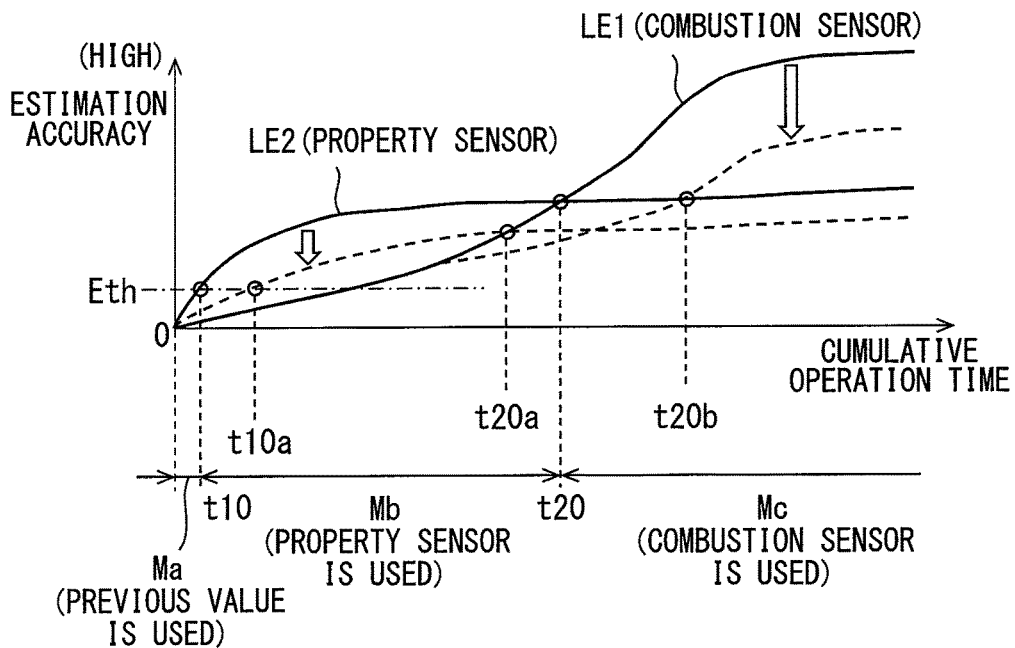
FIG. 12 is a view showing one embodiment in which the estimation accuracy calculated in the processing of FIG. 11 changes with a passage of time.

The horizontal axis in FIG. 12 represents the cumulative operation time of the internal combustion engine 10 after a user supplies fuel to the fuel tank. The vertical axis in FIG. 12 represents the value of the estimation accuracy of a mixing ratio, and the first estimation accuracy E1 calculated in Step S32 is indicated by a solid line LE1 in the view, and the second estimation accuracy E2 calculated in Step S33 by a solid line LE2 in the view. The value on the vertical axis, indicated by the dashed-dotted line in the view, indicate the predetermined accuracy Eth used in the determination of Steps S35 and S35a.

With a passage of the cumulative operation time, opportunities, in which combustion that meets preset combustion conditions is performed, increase. Also, with a passage of the cumulative operation time, the temperature is raised by the heater 28, and hence opportunities, in which a property parameter that meets a preset fuel temperature condition can be acquired, increase. Therefore, with a passage of the cumulative operation time, the number of samples of combustion parameters and property parameters increases. Therefore, the first estimation accuracy E1 and the second estimation accuracy E2 rise with a passage of the cumulative operation time, as indicated by the solid lines LE1 and LE2. However, when a difference between a combustion condition under which detection is to be performed, that is, a preset combustion environment value and a combustion condition under which detection is actually performed is large, or when an increase rate of the number of samples is small, the rising rate of the first estimation accuracy E1 becomes small as indicated by a dotted line. In addition, when a difference between a fuel temperature preset as a condition under which property parameters are to be detected and a fuel temperature at which detection is actually performed is large, or when a rising rate of the number of samples is small, the rising rate of the second estimation accuracy E2 becomes small as indicated by the other dotted line.

A manner in which the first estimation accuracy E1 rises (hereinafter referred to as a rising waveform) with a passage of the cumulative operation time is different from the rising waveform of the second estimation accuracy E2. Specifically, in the initial period in which the cumulative operation time passes, the second estimation accuracy E2 rises faster than the first estimation accuracy E1, as shown in FIG. 12, and hence there is a high probability that the second estimation accuracy E2 may be higher than the first estimation accuracy E1. However, in a period after a certain timing, there is a high probability that the first estimation accuracy E1 may be higher than the second estimation accuracy E2.

In this case, when the processing of FIG. 11 is executed, the processing of Step S38 is executed in a period Ma up to the timing t10 shown in FIG. 12, whereby a target value is corrected by using the previous value. Thereafter, in a period Mb up to the timing t20, the processing of Step S36a is executed, whereby a target value is corrected by using the second estimation value X2 by a property sensor. Thereafter, in the period Mc after the timing t20, the processing of Step S36 is executed, whereby a target value is corrected by using the first estimation value X1 by a combustion sensor.

When the rising rate of the second estimation accuracy E2 becomes small as indicated by the above-described dotted line, a timing, at which the control using the second estimation value X2 is switched to the control using the first estimation value X1, becomes earlier as indicated by a sign t20a. Further, a timing, at which the control using the previous value is switched to the control using the first estimation value X1, is delayed as indicated by a sign t10a. In addition, when the rising rate of the first estimation accuracy E1 becomes small as indicated by the above-described dotted line, a timing, at which the control using the second estimation value X2 is switched to the control using the first estimation value X1, is delayed as indicated by a sign t20b.

In short, in the above-described Step S34, the first estimation value X1, the estimation accuracy of which is improved with an increase in the number of samples of the combustion parameters, is compared with the second estimation value X2, the estimation accuracy of which is improved with an increase in the number of samples of the property parameters. Then, in Steps S36 and S36a, an estimation value with higher estimation accuracy is used for the control of the combustion system. The microcomputer 80a, while executing the processing for selecting an estimation value with higher estimation accuracy by comparing the first estimation value X1 with the second estimation value X2, as described above, provides a comparison/selection unit 83 shown in FIG. 1.

As described above, the combustion system control device according to the present embodiment is provided by the ECU 80, and the ECU 80 includes various control units such as the first estimation unit 81a, the second estimation unit 82a, the comparison/selection unit 83, and the injection control unit 85a.

The first estimation unit 81a estimates the mixing ratio of each molecular structure species included in the fuel based on respective combustion parameters detected when combustion is performed under different combustion conditions. According to the above-described knowledge that "the mixing ratio of each molecular structure species contained in fuel can be estimated from respective combustion parameters detected under different combustion conditions", the above mixing ratio (first estimation value X1) can be estimated by the first estimation unit 81a. The second estimation unit 82a estimates the above mixing ratio based on a plurality of property parameters detected by the property sensors. According to the above-described knowledge that "the mixing ratio of each molecular structure species contained in fuel can be estimated from a plurality of property parameters", the above mixing ratio (second estimation value X2) can be estimated by the second estimation unit 82a.

The various control units control the operation of the combustion system based on the mixing ratio thus estimated, that is, based on the first estimation value X1 or the second estimation value X2, and hence the combustion system can be controlled with a more optimal content in accordance with the fuel than in conventional control in which a combustion system is controlled based on the dynamic viscosity detected by a dynamic viscosity sensor.

Further, the comparison/selection unit 83 compares the first estimation value X1 with the second estimation value X2 to select an estimation value with higher estimation accuracy. Therefore, the combustion system is controlled by using an estimation value with high accuracy, and hence the control of the combustion system with an optimal content in accordance with fuel can be further improved.

Further, attention is paid in the present embodiment to the fact that estimation accuracy is improved with an increase in the number of samples of the combustion parameters and the property parameters, so that the first accuracy calculation unit in Step S32 and the second accuracy calculation unit in Step S33 are provided. The first accuracy calculation unit calculates such that higher estimation accuracy is obtained as the number of samples of the combustion parameters to be used for the estimation by the first estimation unit 81a is larger. That is, the value of the first estimation accuracy E1 is increased. The second accuracy calculation unit calculates such that higher estimation accuracy is obtained as the number of samples of the property parameters to be used for the estimation by the second estimation unit 82a is larger. That is, the value of the second estimation accuracy E2 is increased. The estimation accuracy of each of the first estimation accuracy E1 and the second estimation accuracy E2 is improved with an increase in the number of samples of each of the combustion parameters and the property parameters, as shown in FIG. 12. Therefore, according to the present embodiment in which calculation is performed such that higher estimation is obtained as the number of these samples is larger, the comparison and selection by the comparison/selection unit 83 can be achieved with high accuracy.

Herein, the estimation accuracy may be low, as indicated by the sign Ma in FIG. 12, due to the case where the number of samples of the combustion parameters and the property parameters is small, or the like. In such a case, there is a high possibility that the mixing ratio used most recently in the past may be closer to the actual mixing ratio than the mixing ratio currently estimated. In other words, there is a little possibility that the fuel currently in use may be close to the fuel that was last used.

In the present embodiment in which the above little possibility is taken into consideration, the control units such as the injection control unit 85a control the operation of the combustion system by using the estimation value used most recently in the past, when both the first estimation accuracy E1 and the second estimation accuracy E2 are lower than the predetermined accuracy Eth. Therefore, the possibility that the combustion system may be controlled with a mixing ratio close to the actual fuel can be increased.

Furthermore, at least one of normal paraffins, isoparaffins, naphthenes, and aromatics is included in the molecular structure species in the present embodiment. A desired combustion state can be achieved accurately by estimating the mixing ratio of a molecular structure species classified in these categories, and by reflecting the mixing ratio on various control related to combustion, because these molecular structure species have a large influence on the combustion parameters.

Still furthermore, in the present embodiment, the property parameters include at least one of the dynamic viscosity of the fuel, the density of the fuel, a ratio of hydrogen to carbon contained in the fuel, and the lower calorific value of the fuel. Since these property parameters are greatly influenced by the mixing ratio of a molecular structure species, the estimation accuracy, obtained when the mixing ratio is estimated from a plurality of the property parameters, can be improved.

Still furthermore, in the present embodiment, the combustion conditions are ones specified by a combination of a plurality of types of combustion condition values. That is, combustion parameters, occurring when combustion is performed under each of a plurality of types of combustion condition values, are acquired. According to this, a mixing ratio can be estimated with higher accuracy than in the case where combustion parameters, occurring when combustion is performed under each of the same type of combustion condition values, is acquired and a mixing ratio is estimated based on the combustion conditions and the combustion parameters.

Still furthermore, in the present embodiment, the combustion condition values include at least one of the in-cylinder pressure, the in-cylinder temperature, the intake oxygen concentration, and the fuel injection pressure. According to the embodiment in which a mixing ratio is estimated by using combustion parameters detected when combustion is performed under these different conditions, the mixing ratio can be estimated with high accuracy because these combustion condition values have a large influence on a combustion state.

Still furthermore, in the present embodiment, the combustion property value is the ignition delay time TD from when fuel injection is commanded to when the fuel self-ignites. According to the embodiment in which a mixing ratio is estimated based on the ignition delay time TD, the mixing ratio can be estimated with high accuracy because the ignition delay time TD is greatly influenced by the mixing ratio of each molecular structure species.

Still furthermore, in the present embodiment, the combustion parameter acquisition unit 81 acquires combustion parameters related to the combustion of the fuel injected before main injection (pilot injection). When the fuel in the main injection burns, the in-cylinder temperature rises, and hence the fuel after the main injection is likely to burn. Therefore, a change in the combustion parameters, occurring due to a difference in the mixing ratios in the fuel, is less likely to appear. On the other hand, the fuel injected before the main injection is not influenced by the main combustion, and hence a change in the combustion parameters, occurring due to a difference in the mixing ratios, is likely to appear. Therefore, in estimating a mixing ratio based on the combustion parameters, the estimation accuracy can be improved.

Second Embodiment

Figure 13:
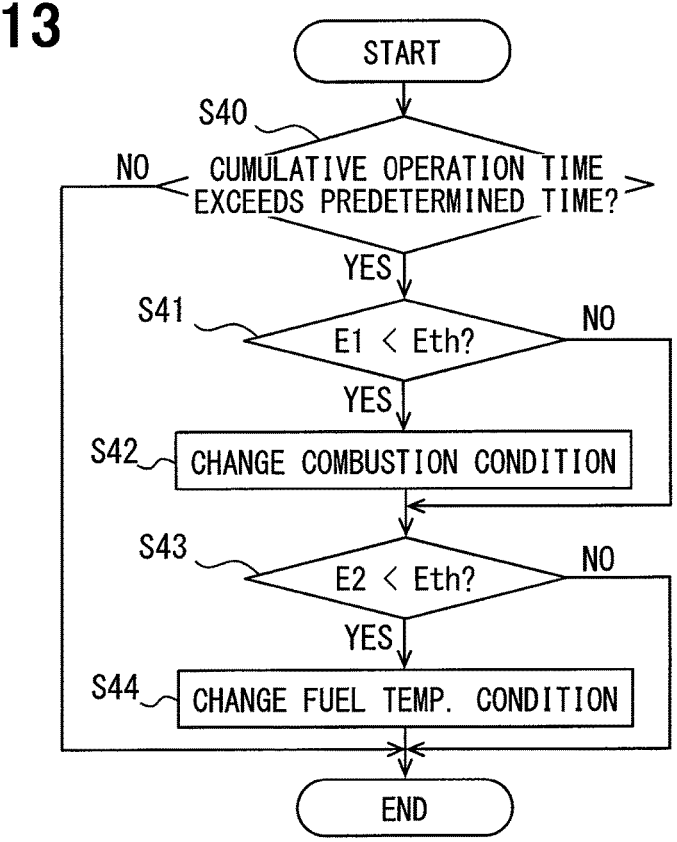
FIG. 13 is a flowchart showing procedures for changing a combustion condition and a fuel temperature condition in a second embodiment of the disclosure.

In the present embodiment, the microcomputer 80*a* repeatedly executes the processing shown in FIG. 13 during the operation of the internal combustion engine 10. That is, it is determined in Step S40 in FIG. 13 whether the cumulative operation time of the internal combustion engine 10, after a user supplies fuel to the fuel tank, exceeds a predetermined time. When it is determined that the predetermined time has passed and when it is determined in the following Step S41 that the first estimation accuracy E1 does not satisfy the predetermined accuracy Eth, the below-described combustion condition change control is executed in the following Step S42. In the combustion condition change control, control for forcibly creating a condition under which detection is to be performed is started. A combustion environment condition under which an ignition timing is to be detected, such as, for example, the in-cylinder temperature, the in-cylinder oxygen concentration, or the injection pressure, is set beforehand. Then, a target value of the injection control, the fuel pressure control, the EGR control, or the like is forcibly changed such that the combustion environment condition is created. For example, when combustion parameters, occurring when combustion is performed under a condition in which an injection pressure, one of the combustion conditions, is within a range of 100 MPa to 150 MPa, can only be acquired, the fuel pressure control unit 85*b* controls the operation of the fuel pump 15*p* such that the injection pressure becomes 200 MPa. Thereby, the combustion parameters, occurring when the injection pressure is 200 MPa, can be acquired, and the acquired combustion parameters can be reflected on the estimation of the first estimation value X1. Therefore, the first estimation accuracy E1 can be quickly set to be equal to or higher than the predetermined accuracy Eth. More specifically, in the case of a user traveling at a low speed in an urban area, there is no opportunity in which the injection pressure is set to 200 MPa, and hence the cumulative operation time may exceed a predetermined time in a state in which the combustion parameters at 200 MPa are not acquired. In this case, the fuel is injected such that the injection pressure is forcibly increased to 200 MPa, and the combustion parameters at the time are acquired.

Next, when it is determined in Step S43 that the second estimation accuracy E2 does not satisfy the predetermined accuracy Eth, the below-described fuel temperature condition change control is executed in the following Step S44. In the fuel temperature condition change control, the operation of the heater 28*a* is controlled such that a fuel temperature condition under which a preset fuel property is to be detected is created.

For example, when a property parameter, occurring when the fuel temperature is changing within a range of 10° C. to 70° C., can only be acquired, the fuel temperature is raised by operating the heater 28*a* such that the fuel temperature becomes 80° C. According to this, a property parameter, occurring when the fuel temperature is 80° C., can be acquired, and the acquired property parameter can be reflected on the estimation of the second estimation value X2. Therefore, the second estimation accuracy E2 can be quickly set to be equal to or higher than the predetermined accuracy Eth.

The microcomputer 80*a*, while executing the combustion condition change control of Step S42, corresponds to the combustion condition control unit, and the microcomputer 80*a*, while executing the fuel temperature condition change control of Step S44, corresponds to a fuel temperature condition control unit.

As described above, the ECU 80 according to the present embodiment includes the combustion condition control unit in Step S42. When the first estimation accuracy E1 is lower than the predetermined accuracy Eth despite the fact that the cumulative operation time of the internal combustion engine 10 has exceeded a predetermined time, the combustion condition control unit controls the operation of the combustion system such that a preset combustion condition under which detection is to be performed is created. Therefore, the first estimation accuracy E1 can be quickly set to be equal to or higher than the predetermined accuracy Eth, and after the cumulative operation time exceeds a predetermined time, the combustion system can be quickly switched to a state in which the combustion system is controlled with an optimal content in accordance with the fuel. For example, in the case shown in FIG. 12, the period Mb in which a target value is corrected by using the second estimation value X2 by the property sensor can be quickly shifted to the period Mc in which a target value is corrected by using the first estimation value X1 by the combustion sensor.

Further, in the present embodiment, each of the plurality of property parameters to be used for the estimation by the second estimation unit 82a is detected by the property sensor in a state where the fuel temperature is different, and the ECU 80 includes the fuel temperature condition control unit in Step S44. When the second estimation accuracy E2 is lower than the predetermined accuracy Eth despite the fact that the accumulated operation time of the internal combustion engine 10 has exceeded a predetermined time, the fuel temperature condition control unit controls the heating of the fuel such that the fuel temperature becomes a temperature not used for the estimation by the estimation unit 82a. Therefore, the second estimation accuracy E2 can be quickly set to be equal to or higher than the predetermined accuracy Eth, and after the cumulative operation time exceeds a predetermined time, the combustion system can be quickly shifted to a state in which it is controlled with an optimal content in accordance with the fuel. For example, in the case shown in FIG. 12, the period Ma in which a target value is corrected by using the previous value can be quickly shifted to the period Mb in which a target value is corrected by using the second estimation value X2 by the property sensor.

Third Embodiment

Figure 14:
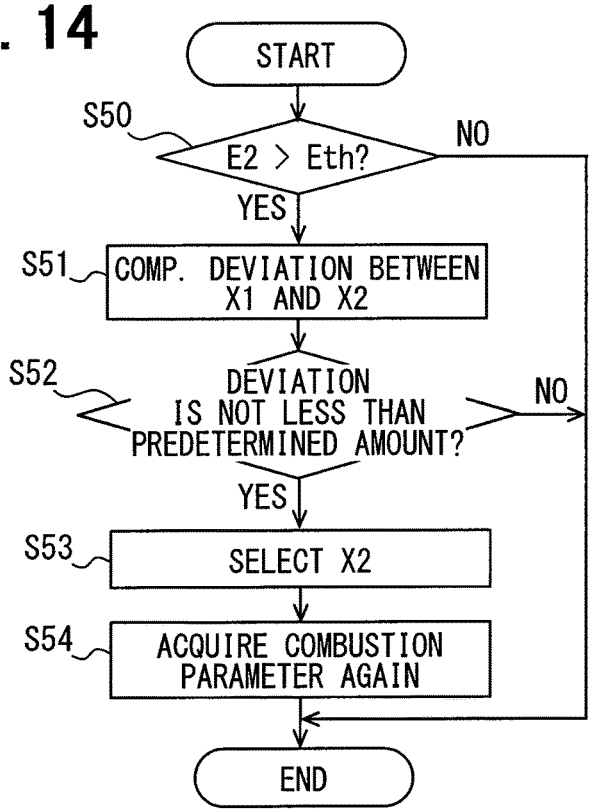
FIG. 14 is a flowchart showing procedures for re-acquiring a combustion parameter in a third embodiment of the disclosure.

In the present embodiment, the microcomputer 80a repeatedly executes the processing shown in FIG. 14 during the operation of the internal combustion engine 10 in addition to the processing executed in the first embodiment. That is, it is determined in Step S50 in FIG. 14 whether the estimation accuracy of the second estimation value X2, that is, the second estimation accuracy E2 satisfies the predetermined accuracy Eth. The predetermined accuracy Eth to be used in this determination is the same as the value to be used in the determination of Step S35a in FIG. 11. Herein, the second estimation accuracy E2 is a value calculated by the second accuracy calculation unit in Step S33 in FIG. 11.

When it is determined that the second estimation accuracy E2 satisfies the predetermined accuracy Eth, a gap amount (deviation) between the first estimation value X1 and the second estimation value X2 is calculated in the following Step S51. Specifically, the above gap amount is calculated for each molecular structure species. The microcomputer 80a, while executing the processing of this Step S51, provides a deviation calculation unit that calculates a deviation between the first estimation value X1 and the second estimation value X2.

In the following Step S52, it is calculated for each molecular structure species whether the gap amount calculated in Step S51 is equal to or larger than a predetermined amount. If there is even one molecular structure species for which it has been determined that the gap amount is equal to or larger than the predetermined amount, the estimation value selected by the comparison/selection unit 83 is forcibly set to the second estimation value X2 in the following Step S53, even if the first estimation accuracy E1 is higher than the second estimation accuracy E2.

In the following Step S54, the acquisition of a combustion parameter by the combustion parameter acquisition unit 81 is executed again. That is, the in-cylinder pressure sensor 21 re-detects a combustion parameter, and the first estimation unit 81a re-estimates the first estimation value X1 by using the re-detected combustion parameter. For example, when there is one molecular structure species for which it has been determined in Step S52 that the gap amount is large, a combustion condition that most contributes to the mixing ratio of the molecular structure species is estimated. Then, the combustion parameter detected under the combustion condition is re-acquired and updated. Alternatively, the combustion condition is forcibly changed such that the combustion condition is created, in the same way as in Step S42 in FIG. 13. In addition, the combustion parameters for all combustion conditions are re-acquired and updated, irrespective of whether a combustion condition has been forcibly changed.

When the number of samples of the combustion parameters and the property parameters is sufficiently secured, the first estimation value X1 is more accurate than the second estimation value X2, as described above. The first estimation value X1 is basically higher in accuracy; however, the first estimation value X1 may be exceptionally lower in accuracy, such as when an error of the value of the combustion condition of the combustion parameter used for the estimation of the first estimation value X1 is large. In other words, there is the possibility that even though the number of samples is sufficient, the first estimation value X1 may be low in accuracy. On the other hand, with regard to the second estimation value X2, the possibility that the accuracy may be low is lower than the first estimation value X1, when the number of samples is sufficient. Therefore, when the first estimation value X1 is low in accuracy despite the sufficient number of samples, the deviation should be large if the second estimation accuracy E2 is higher than the predetermined accuracy Eth. In view of this, a deviation calculation unit in Step S51, which calculates a deviation between the first estimation value X1 and the second estimation value X2, is included in the present embodiment. Even if the first estimation accuracy E1 calculated by the first accuracy calculation unit is higher than the second estimation accuracy E2 calculated by the second accuracy calculation unit, the comparison/selection unit 83 selects the second estimation value X2 if the following condition is satisfied. That is, when the second estimation accuracy E2 is higher than the predetermined accuracy Eth and when the above deviation is equal to or larger than a predetermined amount, the comparison/selection unit 83 selects the second estimation value X2.

Therefore, when the first estimation value X1 is exceptionally lower in accuracy, the second estimation value X2 should be selected, as described above, whereby the possibility that the combustion system may be controlled at a mixing ratio close to the actual fuel can be increased.

Further, in the present embodiment, the in-cylinder pressure sensor 21 re-detects a combustion parameter and the first estimation unit 81a re-estimates the first estimation value X1, when the above deviation is equal to or larger than a predetermined amount.

Therefore, when the first estimation value X1 is exceptionally lower in accuracy, a combustion parameter is re-detected and the first estimation value X1 is re-estimated, as described above, whereby the first estimation value X1 with higher accuracy than the second estimation value X2 can be obtained. Thereby, the above deviation falls within a range smaller than the predetermined amount, and the first estimation value X1 with high accuracy is selected and used for the control. Therefore, the possibility that the combustion system may be controlled at a mixing ratio close to the actual fuel can be increased.

Fourth Embodiment

The first accuracy calculation unit according to the first embodiment calculates the first estimation accuracy E1 by collecting a plurality of types of the first estimation values X1. That is, there are variations in the estimation accuracy among a plurality of the first estimation values X1, but it can be said that the first estimation accuracy E1 is calculated by averaging the variations. On the other hand, a first accuracy calculation unit according to the present embodiment calculates the first estimation accuracy for each of the plurality of types of the first estimation values X1. For example, for each of the estimation value of the mixing ratio of normal paraffins, the estimation value of the mixing ratio of isoparaffins, the estimation value of the mixing ratio of naphthenes, and the estimation value of the mixing ratio of aromas, which are estimated by the first estimation unit 81a, estimation accuracy is calculated. Similarly, a second accuracy calculation unit according to the embodiment calculates second estimation accuracy for each of the plurality of types of the second estimation values X2.

A comparison/selection unit according to the present embodiment compares each of the plurality of types of the first estimation values X1 with each of the plurality of types of the second estimation values X2 to select an estimation value. For example, for each of the mixing ratio of normal paraffins, the mixing ratio of isoparaffins, the mixing ratio of naphthenes, and the mixing ratio of aromas, an estimation value with higher estimation accuracy between the first estimation value X1 and the second estimation value X2 is selected. A control unit according to the embodiment uses each selected estimation value for the control of the combustion system.

As described above with reference to FIG. 12, the rising waveform of the first estimation accuracy E1 with a passage of the cumulative operation time is different from the rising waveform of the second estimation accuracy E2. Strictly speaking, the rising waveform differs depending on a molecular structure species. Therefore, the timing (see t10) at which the control using the second estimation value X2 is switched to the control using the first estimation value X1, and the timing (see t20) at which the control using the previous value is switched to the control using the first estimation value X1 differ depending on a molecular structure species.

In view of this point, in the present embodiment, the first accuracy calculation unit calculates the first estimation accuracy E1 for each of the plurality of types of the first estimation values X1, and the second accuracy calculation unit calculates the second estimation accuracy E2 for each of the plurality of types of the second estimation values X2. Then, the comparison/selection unit 83 compares each of the plurality of types of the first estimation values X1 with each of the plurality of types of the second estimation values X2 to select an estimation value with higher estimation accuracy. The control unit uses each selected estimation value for the control of the combustion system. Therefore, the estimation value of a mixing ratio to be used for controlling the combustion system is allowed to have further high accuracy.

Fifth Embodiment

In the present embodiment, the first estimation accuracy and the second estimation accuracy are calculated for each of the plurality of types of the first estimation values X1 and the second estimation values X2, in the same way as in the fourth embodiment. In addition to that, the below-described lubrication index and combustion index are further included in each of the plurality of types of the first estimation values X1 and the second estimation values X2 in the embodiment.

The lubrication index is one representing the lubricity by fuel of a sliding portion that slides while being exposed to the fuel, among sliding portions included in the combustion system. Specific examples of the sliding portion include an outer peripheral portion S1 of the piston 15p1 included in the fuel pump 15p shown in FIG. 1 and an outer peripheral portion S2 of the valve body included in the fuel injection valve 15. The combustion index is one representing the ease of combustion, and is one representing, for example, the ease of self-ignition or the magnitude of heat generation.

The lubrication index and the combustion index correlate with the mixing ratio of each molecular structure species. This means that the lubrication index and the combustion index can be estimated based on respective combustion parameters detected when combustion is performed under different combustion conditions, and that the lubrication index and the combustion index can be estimated based on a plurality of property parameters. The lubrication index and the combustion index that can be estimated in this way correspond to the property values representing the properties of the fuel, and may be values to be estimated by the first estimation unit 81a and the second estimation unit 82a. Other examples of the property values include the general property values of fuel, such as the distillation property T50, dynamic viscosity, and density, and the above-described intermediate parameters such as average carbon number and HO ratio.

Further, in the present embodiment, the predetermined accuracy Eth to be used in Steps S35 and S35a in FIG. 11 and in Steps S41 and S43 in FIG. 13 are set to different values for each of the plurality of types of the first estimation values X1 and the second estimation values X2. Specifically, the predetermined accuracy Eth set for the lubrication index is set to a value lower than the predetermined accuracy Eth set for the combustion index.

According to the present embodiment, the predetermined accuracy Eth is set to different values for each of the plurality of types of the first estimation values X1 and the second estimation values X2, as described above. Therefore, the timing (see t10), at which the control using the second estimation value X2 is shifted to the control using the first estimation value X1, can be set to a timing suitable for each property value such as the lubrication index or the combustion index. In addition, the timing (see t20), at which the control using the previous value is switched to the control using the first estimation value X1, can be set to a timing suitable for each property value such as the lubrication index or the combustion index.

Sixth Embodiment

When a failure occurs in the density sensor 27 or the dynamic viscosity sensor 28 (property sensor), or in the in-cylinder pressure sensor 21 (combustion sensor) due to disconnection or short circuit, the value detected by the sensor is fixed to an abnormal value. Therefore, the microcomputer 80a according to the present embodiment diagnoses the presence or absence of a failure, such as disconnection and short circuit, in the property sensor and the combustion sensor based on whether the detected value is fixed to an abnormal value.

On the other hand, there may be the case where a value offset with respect to a normal value is outputted, for example, due to the aging of these sensors, or where a value detected with an incorrect gain is outputted, that is, where a failure (intermediate value failure), is caused in a mode in which the detection value is not fixed to an abnormal value. For such an intermediate value failure, the microcomputer 80a repeatedly executes, at predetermined intervals, the failure diagnosis processing shown in FIGS. 15 and 16 during the operation of the internal combustion engine 10.

Figure 15:
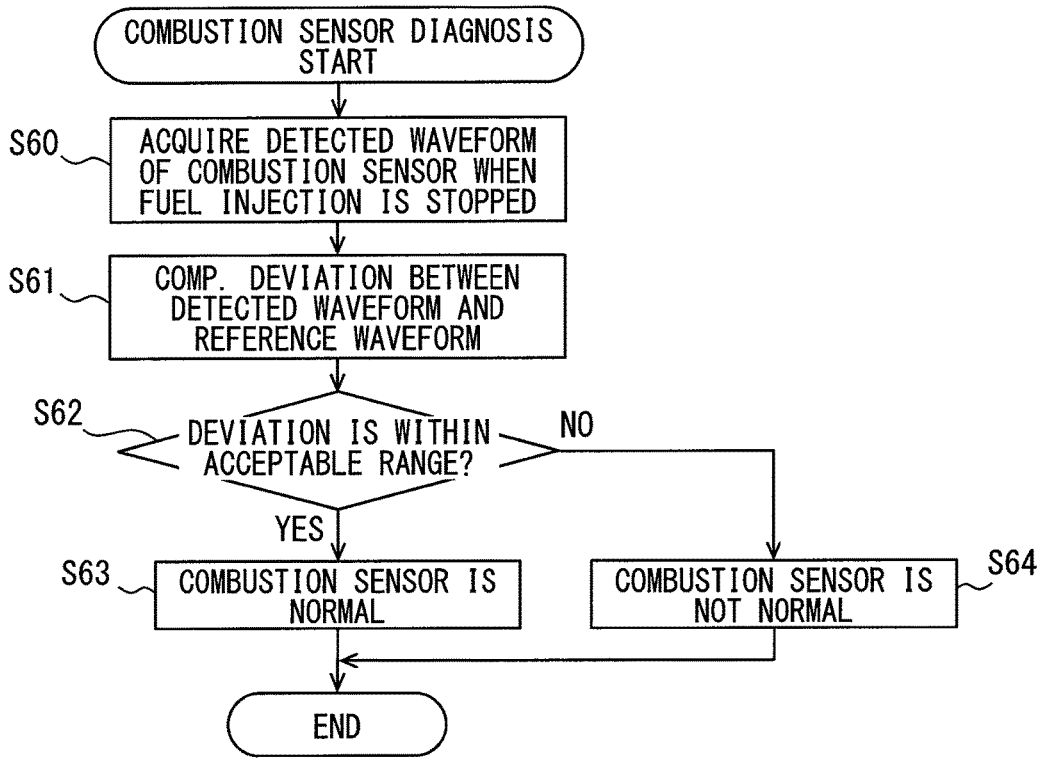
FIG. 15 is a flowchart showing procedures for diagnosing the presence or absence of a failure of a combustion sensor in a sixth embodiment of the disclosure.

In Step S60 in FIG. 15, a plurality of the values detected by the in-cylinder pressure sensor 21 are acquired during a non-injection period in which the fuel injection from the fuel injection valve 15 is stopped, and a waveform (detected waveform) formed of the plurality of the detected values is acquired. For example, in a non-injection period, a waveform, representing a change in the in-cylinder pressure in a predetermined period including at least a compression stroke, should be a waveform (reference waveform) that is assumed in advance. Therefore, a gap amount between the detected waveform detected in the predetermined period by the in-cylinder pressure sensor 21 and the reference waveform is calculated in the following Step S61.

It is determined in the following Step S62 whether the gap amount calculated in Step S61 is within an acceptable range. When the gap amount is determined to be within the acceptable range, it is diagnosed in the following Step S63 that the in-cylinder pressure sensor 21 is normal. When the gap amount is determined to be out of the acceptable range, it is diagnosed in the following Step S64 that the in-cylinder pressure sensor 21 is out of order.

The microcomputer 80a, while executing the processing of FIG. 15, functions as a combustion sensor diagnosis unit. When the combustion sensor diagnosis unit diagnoses that the combustion sensor is out of order, the processing of Step S36 is prohibited, and the control of the operation of the combustion system based on the first estimation value X1 is prohibited.

Figure 16:
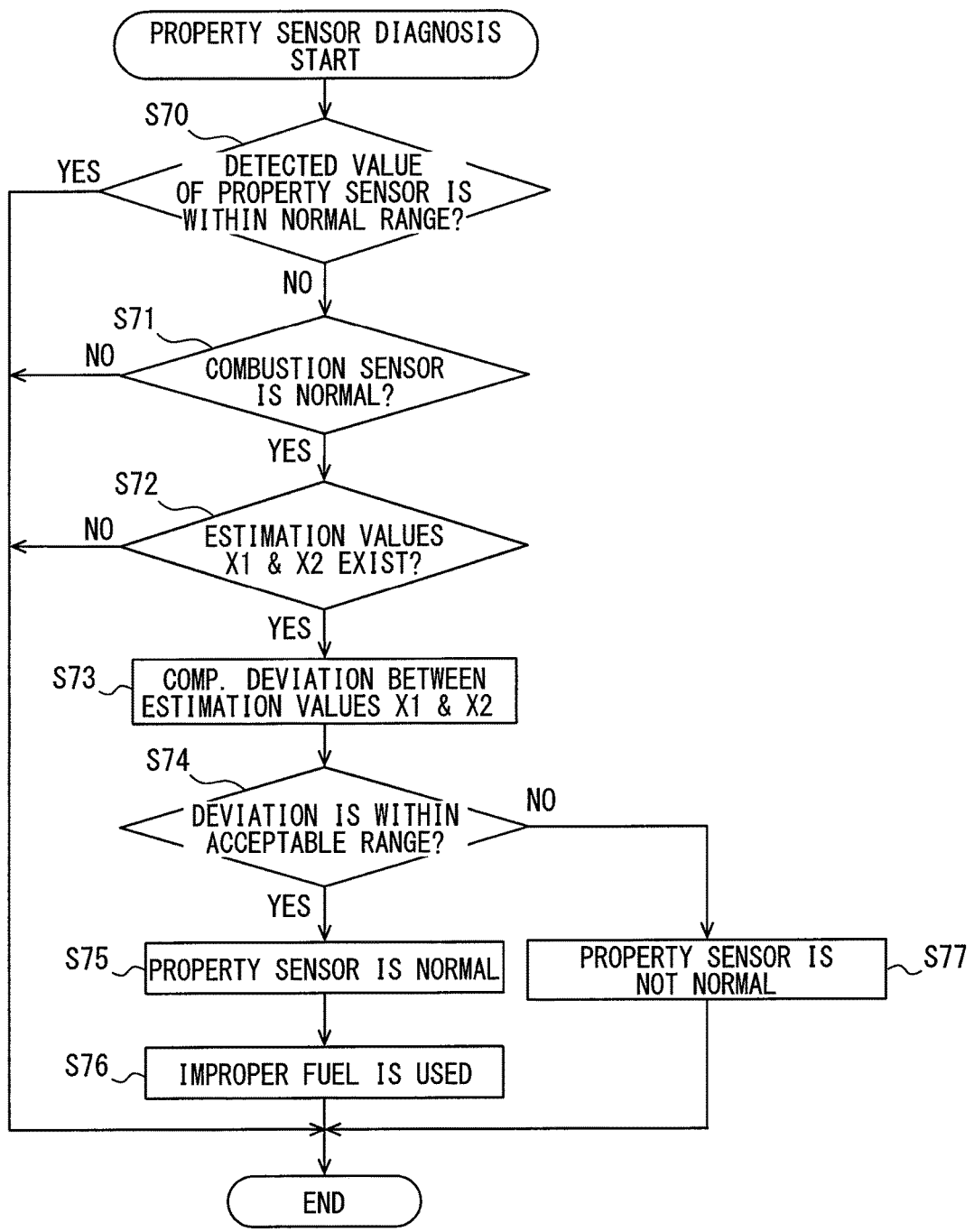
FIG. 16 is a flowchart showing procedures for diagnosing the presence or absence of a failure of a property sensor in the sixth embodiment of the disclosure.

It is determined in Step S70 in FIG. 16 whether the value detected by the property sensor is within a normal range. For example, a normal range, which can be assumed from the dynamic viscosity of proper fuel circulating in the market, is set and stored beforehand, so that the determination is made by comparing the normal range with the detected value. When the detected value is determined to be out of the normal range, it is determined in the following Step S71 whether the combustion sensor is normal. That is, a determination result of Step S62 in FIG. 15 is acquired. When the combustion sensor is determined to be normal, it is determined in the following Step S72 whether there are the first estimation value X1 and the second estimation value X2 that satisfy the predetermined accuracy Eth. When it is determined in Step S72 that there are the first estimation value X1 and the second estimation value X2, a gap amount between both the estimation values X1 and X2 is calculated in the following Step S73. For example, a difference between both the estimation values X1 and X2 is calculated for each of the plurality of types of mixing ratios.

It is determined in the following Step S74 whether the gap amount calculated in Step S73 is within an acceptable range. For example, when all of the plurality of types of mixing ratios are within the acceptable range, a positive determination is made in Step S74, and it is diagnosed in following Step S75 that the property sensor is normal. Then, it is diagnosed in the following Step S76 that improper fuel is used instead of the assumed proper fuel. On the other hand, when it is determined in Step S74 that the gap amount is out of the acceptable range, it is diagnosed in the following Step S77 that the property sensor is out of order.

The microcomputer 80a, while executing the processing of FIG. 16, functions as a property sensor diagnosis unit. When it is diagnosed by the property sensor diagnosis unit that the property sensor is out of order, the processing of Step S36a is prohibited, and the control of the operation of the combustion system based on the second estimation value X2 is prohibited.

As described above, an ECU 80 according to the present embodiment includes the combustion sensor diagnosis unit and the property sensor diagnosis unit in addition to the first estimation unit 81a and the second estimation unit 82a. According to this, the presence or absence of a failure of the combustion sensor is diagnosed based on the value detected by the combustion sensor while combustion is not being performed, and hence the combustion sensor can be diagnosed with high accuracy. Therefore, when the mixing ratio (first estimation value X1) estimated from the combustion sensor and the mixing ratio (second estimation value X2) estimated from the property sensor greatly diverge from each other, and when the combustion sensor is diagnosed to be normal, the probability that the property sensor may be out of order is high. In view of this point, the property sensor diagnosis unit diagnoses the presence or absence of a failure of the property sensor by comparing both the estimation values X1 and X2 with each other when the combustion sensor is diagnosed to be normal, and hence the presence or absence of an intermediate value failure of the property sensor can be diagnosed.

Then, when the combustion sensor is diagnosed to be out of order, the first estimation value X1 is prohibited from being used for the control, and when the property sensor is diagnosed to be out of order, the second estimation value X2 is prohibited from being used for the control. Therefore, controlling the combustion system based on an erroneous mixing ratio can be avoided.

Other Embodiments

Although the preferred embodiments of the invention have been described above, the invention is not limited to the above-described embodiments at all, and various modifications can be made as exemplified below. Not only combinations of parts that clearly indicate that combinations are specifically possible in each embodiment, but also partial combinations of the embodiments are possible when there is no particular obstruction to the combinations, even if not explicitly stated.

In the first embodiment, the first estimation value X1 by the first estimation unit 81a is set as the combustion parameter. On the other hand, the first estimation value X1 may be set as a property value such as the above-described intermediate parameter. In estimating the plurality of types of the first estimation values X1, both the combustion parameters and the property values may be included in the values to be used for the estimation of the first estimation values X1. The same applies to the second estimation value X2 by the second estimation unit 82a, and may be set as a property value such as the intermediate parameter, and both the combustion parameters and the property values may be included in the values to be used for the estimation of the second estimation values X2.

In the embodiment shown in FIG. 2, the time between the timing t1 at which powering is started and the timing t3 at which combustion is started is defined as the ignition delay time TD. On the other hand, the time between the timing t2 at which injection is started and the timing t3 at which combustion is started may be defined as the ignition delay time TD. The timing t2 at which injection is started may be estimated by detecting a timing, at which a change in the fuel pressure such as the rail pressure occurs with the start of injection and based on the detected timing.

The combustion parameter acquisition unit 81 shown in FIG. 1 acquires the ignition delay time TD as a detected value (combustion parameter) of a physical quantity related to combustion. On the other hand, the combustion parameter acquisition unit 81a may acquire, as combustion parameters, a waveform representing a change in the heat generation rate, a heat amount (heat generation amount) generated by the combustion of the corresponding fuel, and the like. In addition, the mixing ratios of various components may be estimated based on a plurality of types of combustion parameters such as the ignition delay time TD, the waveform of heat generation rate, and the heat generation amount. For example, the constants shown in the matrix on the left side of the right side in FIG. 3 are set to values corresponding to the plurality of types of combustion parameters, and the mixing ratios are estimated by substituting the plurality of types of combustion parameters into the matrix on the right side of the right side in FIG. 3.

In the example of FIG. 3, the combustion conditions are set such that all of the combustion environment values are different for each of the plurality of the ignition delay times TD. That is, for the respective combustion conditions i, j, k, and l (see FIG. 3) each formed of a predetermined combination of the combustion environment values, all of the in-cylinder pressures are set to different values P (condition i), P (condition j), P (condition k), and P (condition l). Similarly, all of the in-cylinder temperatures T, all of the intake oxygen concentrations $O_2$, and all of the injection pressures Pc are set to different values. On the other hand, for the respective different combustion conditions, at least one of the combustion environment values may be different. For example, for the respective combustion conditions i and j, all of the in-cylinder temperatures T, all of the intake oxygen concentrations $O_2$, and all of the injection pressures Pc are set to the same value, and only the in-cylinder pressures may be set to different values P (condition i) and P (condition j).

In the above-described embodiments, combustion parameters related to the combustion of the fuel injected (pilot injection) just before the main injection are acquired. On the other hand, combustion parameters related to the combustion of the fuel injected after the main injection may be acquired. Specific examples of the injection after the main injection include both after-injection in which fuel is injected during main combustion and post-injection in which fuel is injected after the main combustion. When multi-stage injection, in which injection is performed plural times before the main injection, is performed, it is preferable to acquire combustion parameters related to the combustion of the fuel injected for the first time, because the combustion is not greatly influenced by the main combustion.

In the above-described embodiments, combustion parameters are acquired based on the value detected by the in-cylinder pressure sensor 21. On the other hand, in a configuration not including the in-cylinder pressure sensor 21, combustion parameters may be estimated based on the rotational fluctuation (differential value of the rotation number) of a rotation angle sensor. For example, the timing, at which the differential value exceeds a predetermined threshold value due to the pilot combustion, can be estimated as a pilot ignition timing. In addition, a pilot combustion amount can be estimated from the magnitude of the differential value.

In the embodiment shown in FIG. 1, the in-cylinder temperature is detected by the temperature detection element 21a, but the in-cylinder temperature may be estimated based on the in-cylinder pressure detected by the in-cylinder pressure sensor 21. Specifically, the in-cylinder temperature is estimated from the calculation using the in-cylinder pressure, the cylinder volume, the gas weight in the cylinder, and the gas constant.

In the first embodiment, in calculating the mixing ratio of each molecular structure species by substituting the ignition delay times TD into the determinant of FIG. 3, the combustion parameter acquisition unit 81 makes the calculation of the mixing ratio stand by until the target number of samples of the ignition delay times TD is reached. Specifically, the combustion parameter acquisition unit 81 makes the calculation of the mixing ratio stand by until all the values to be substituted into the matrix on the right side of the right side of the determinant of FIG. 3 are obtained. On the other hand, even in a state in which all the values are not obtained, part of the plurality of mixing ratios may be calculated by changing the number of columns of the matrix representing constants in accordance with the number of samples. Alternatively, preset nominal values may be substituted into the matrix of the ignition delay times TD instead of the ignition delay times TD that have not been acquired, so that a plurality of mixing ratios are calculated.

In the first embodiment, the density sensor 27 and the dynamic viscosity sensor 28 are provided with the heater 28a. On the other hand, a configuration may be adopted in which a plurality of property parameters detected under different temperature conditions and pressure conditions are acquired by providing property sensors at a plurality of places where fuel temperatures and fuel pressures are different. In this case, it is sufficient to provide the property sensors at different places other than the fuel tank. For example, the property sensors are provided on a passage through which the fuel is pumped from a fuel feed pump to a high-pressure pump, inside the common rail, and on a passage through which the fuel is returned from a pressure reducing valve to the fuel tank, respectively. Thereby, densities and dynamic viscosities can be acquired under different temperature conditions and pressure conditions, so that the above mixing ratios can be calculated by using the acquired densities and dynamic viscosities.

In addition, the mixing ratios may be calculated based on a plurality of property parameters each acquired when both a pressure condition and a temperature condition are different, or may be calculated based on a plurality of property parameters each acquired when one of the pressure condition and the temperature condition is different.

In addition, in the first embodiment, the second estimation unit 82a estimates the mixing ratio based on both the property parameter (fuel density) detected by the density sensor 27 and the property parameter (dynamic viscosity) detected by the dynamic viscosity sensor 28. That is, the mixing ratio is estimated based on a plurality of types of property parameters. On the other hand, the mixing ratio may be estimated based on a property parameter detected by one of the density sensor 27 and the dynamic viscosity sensor 28. In this case, however, it is necessary to estimate based on property parameters detected at different temperatures or pressures. That is, a configuration may be adopted in which a plurality of property parameters are acquired, as the property parameters of the fuel, by making detection conditions for the fuel, such as temperature conditions and pressure conditions, different.

The calculation of a dynamic viscosity is not limited to that based on the value detected by the dynamic viscosity sensor 28. For example, the fuel pressure in a fuel passage from the common rail 15c to the injection hole of the fuel injection valve 15 is detected by a pressure sensor, and a pressure waveform indicating the time change of the detected fuel pressure is acquired. Then, the velocity of a pressure wave forming the acquired pressure waveform may be calculated, so that the density and dynamic viscosity of the fuel are calculated based on the velocity of the pressure wave.

In the sixth embodiment, a failure of a property sensor is diagnosed by comparing the mixing ratio (estimation value X1) estimated by the first estimation unit 81a based on combustion parameters with the mixing ratio (estimation value X2) estimated by the second estimation unit 82a based on property parameters. That is, the diagnosis is made by comparing the mixing ratios with each other. On the other hand, a failure of a property sensor may be diagnosed by estimating a property parameter based on the combustion parameter detected by the combustion sensor and by comparing the estimation value with the property parameter detected by the property sensor. That is, the diagnosis is made by comparing the property parameters with each other.

In the third embodiment, each of the first estimation value X1 and the second estimation value X2 to be used for the calculation of a gap amount in Step S51 in FIG. 14 is the mixing ratio of each molecule mixture species. That is, a gap amounts is calculated by comparing the mixing ratios with each other. On the other hand, a property parameter may be estimated based on the combustion parameter detected by a combustion sensor, so that a gap amount between the estimation value and the property parameter detected by a property sensor is calculated in Step S51 in FIG. 14. That is, a gap amount between them may be calculated by comparing the property parameters with each other, and the gap amount may be used for the determination of Step S52. When the mixing ratios are compared with each other, the estimation value by a combustion sensor and the estimation value by a property sensor are compared with each other, in which both the estimation values are compared with each other. On the other hand, when the property parameters are compared with each other, the values detected by the property sensors are to be compared instead of comparing the mixing ratios estimated from the values detected by the property sensors with each other. Therefore, when an error in the values of the combustion conditions, under which the combustion parameters to be used for the estimation of the first estimation value X1 are detected, is large, or the like, it is determined with high accuracy whether the first estimation value X1 is exceptionally lower in accuracy.

In FIG. 14 of the third embodiment, the processing of Steps S51 to S54 are executed on condition that the second estimation accuracy E2 satisfies the predetermined accuracy Eth, that is, a positive determination is made in Step S50. On the other hand, the fact that the first estimation accuracy E1 satisfies the predetermined accuracy Eth may be added to the execution conditions for Step S51 to S54. Herein, the first estimation accuracy E1 is a value calculated by the first accuracy calculation unit in Step S32 in FIG. 11.

In the first embodiment, the first estimation accuracy E1 is calculated, in Step S32 in FIG. 11, to have a higher value, as the number of samples is larger. On the other hand, the first estimation accuracy E1 may be calculated to have a higher value, as a combustion environment value related to the sampling is closer to a determined combustion environment value. Alternatively, the first estimation accuracy E1 may be calculated based on both a degree of divergence between a combustion environment value related to the sampling and a determined combustion environment value and the number of samples.

In the first embodiment, the second estimation accuracy E2 is calculated, in Step S33 in FIG. 11, to have a higher value, as the number of samples is larger. On the other hand, the second estimation accuracy E2 may be calculated to have a higher value, as the fuel temperature related to the sampling is closer to a determined fuel temperature. Alternatively, the second estimation accuracy E2 may be calculated based on both a degree of divergence between a fuel temperature related to the sampling and a determined fuel temperature and the number of samples.

Means and/or functions provided by the ECU 80 that is the combustion system control device can be provided by software recorded on a substantive storage medium, computer executing the software, software only, hardware only, or a combination thereof. For example, when the combustion system control device is provided by a circuit that is hardware, it can be provided by a digital circuit or an analog circuit including many logic circuits.

Although the present disclosure has been described in accordance with embodiments, it is understood that the disclosure should not be limited to the embodiments and structures. The present disclosure encompasses various modifications and variations within the equivalent scope. In addition, various combinations and forms, as well as other combinations and forms including, in them, only one element, more than one, or less, are also within the scope and idea of the disclosure.

The invention claimed is:

1. A combustion system control device that is applied to a combustion system including an internal combustion engine, an combustion sensor that detects a combustion parameter representing a combustion state of the internal combustion engine, and a property sensor that detects a property parameter representing a property of fuel to be used for combustion of the internal combustion engine, and that controls operation of the combustion system, the combustion system control device comprising:
    a first estimation unit that estimates, as a first estimation value, at least one of a mixing ratio of each molecular structure species contained in the fuel and a property value representing the property of the fuel based on the respective combustion parameters detected when combustion is performed under different combustion conditions among the combustion parameters detected by the combustion sensor;
    a second estimation unit that estimates, as a second estimation value, at least one of the mixing ratio and the property value based on a plurality of the property parameters detected by the property sensor;
    a comparison/selection unit that compares the first estimation value with the second estimation value to select an estimation value with higher estimation accuracy; and
    a control unit that controls operation of the combustion system by using the estimation value selected by the comparison/selection unit.

2. The combustion system control device according to claim 1 further comprising:
    a first accuracy calculation unit that calculates estimation accuracy of the first estimation value by the first estimation unit, so that the estimation accuracy is calculated to be higher as the number of samples of the combustion parameters to be used by the first estimation unit is larger; and a second accuracy calculation unit that calculates estimation accuracy of the second estimation value by the second estimation unit, so that the estimation accuracy is calculated to be higher as the number of samples of the property parameters to be used by the second estimation unit is larger, wherein the comparison/selection unit compares first estimation accuracy that is the estimation accuracy calculated by the first accuracy calculation unit with second estimation accuracy that is the estimation accuracy calculated by the second accuracy calculation unit.

3. The combustion system control device according to claim 2, further comprising a deviation calculation unit that calculates a deviation between the first estimation value and the second estimation value, wherein when the deviation is equal to or larger than a predetermined amount and when the second estimation accuracy is higher than predetermined accuracy, the comparison/selection unit selects the second estimation value, even if the first estimation accuracy is higher than the second estimation accuracy.

4. The combustion system control device according to claim 3, wherein when the deviation is equal to or larger than the predetermined amount, the combustion sensor re-detects the combustion parameters and the first estimation unit re-estimates the first estimation value.

5. The combustion system control device according to claim 2, wherein the first estimation unit estimates a plurality of types of the first estimation values, the second estimation unit estimates a plurality of types of the second estimation values, the first accuracy calculation unit calculates estimation accuracy for each of the plurality of types of the first estimation values, the second accuracy calculation unit calculates estimation accuracy for each of the plurality of types of the second estimation values, the comparison/selection unit compares each of the plurality of types of the first estimation values with each of the plurality of types of the second estimation values to select an estimation value, and the control unit uses respective selected estimation values for control of the combustion system.

6. The combustion system control device according to claim 5, wherein when both the estimation accuracy calculated by the first accuracy calculation unit and the estimation accuracy calculated by the second accuracy calculation unit are lower than predetermined accuracy, the control unit controls operation of the combustion system by using the first estimation value or the second estimation value that has been used most recently in the past, and the predetermined accuracy is set to a different value for each of the plurality of types of the first estimation values and the plurality of types of the second estimation values.

7. The combustion system control device according to claim 2, wherein when both the estimation accuracy calculated by the first accuracy calculation unit and the estimation accuracy calculated by the second accuracy calculation unit are lower than predetermined accuracy, the control unit controls operation of the combustion system by using the first estimation value or the second estimation value that has been used most recently in the past.

8. The combustion system control device according to claim 2, comprising a combustion condition control unit that controls the operation of the combustion system such that: when the estimation accuracy calculated by the first accuracy calculation unit is lower than the predetermined accuracy despite the fact that a cumulative operation time of the internal combustion engine, after fuel is supplied, exceeds a predetermined time, the combustion condition that is not used for the estimation by the first estimation unit is created.

9. The combustion system control device according to claim 2, wherein the combustion system includes a heater that heats fuel to be detected by the property sensor, the respective property parameters to be used for estimation by the second estimation unit are detected by the property sensor in states where fuel temperatures are different, and the combustion system control device comprises a fuel temperature condition control unit that controls heating of the fuel such that: when the estimation accuracy calculated by the second accuracy calculation unit is lower than the predetermined accuracy despite the fact that a cumulative operation time of the internal combustion engine, after fuel is supplied, exceeds a predetermined time, a fuel temperature that is not used for the estimation by the second estimation unit is created.

* * * * *